US012241662B2

(12) United States Patent
Yoshimoto et al.

(10) Patent No.: US 12,241,662 B2
(45) Date of Patent: Mar. 4, 2025

(54) SOLID-STATE REFRIGERATION APPARATUS

(71) Applicant: DAIKIN INDUSTRIES, LTD., Osaka (JP)

(72) Inventors: Akio Yoshimoto, Osaka (JP); Junichi Teraki, Osaka (JP); Michio Moriwaki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 322 days.

(21) Appl. No.: 17/684,244

(22) Filed: Mar. 1, 2022

(65) Prior Publication Data

US 2022/0186991 A1  Jun. 16, 2022

Related U.S. Application Data

(63) Continuation of application No. PCT/JP2020/034168, filed on Sep. 9, 2020.

(30) Foreign Application Priority Data

Sep. 26, 2019  (JP) .................................. 2019-175532

(51) Int. Cl.
*F25B 21/00* (2006.01)

(52) U.S. Cl.
CPC ...... *F25B 21/00* (2013.01); *F25B 2321/0023* (2013.01)

(58) Field of Classification Search
CPC .............. F25B 21/00; F25B 2321/0023; F25B 2321/002; F25B 2321/0021;

(Continued)

(56) References Cited

U.S. PATENT DOCUMENTS

2014/0165595 A1  6/2014  Zimm et al.
2015/0267943 A1*  9/2015  Kim ........................ F25B 21/00
                                                                       62/3.1

(Continued)

FOREIGN PATENT DOCUMENTS

CN       105723168 A    6/2016
EP       2 863 153 A1   4/2015

(Continued)

OTHER PUBLICATIONS

European Search Report of corresponding EP Application No. 20 86 7195.8 dated Jul. 6, 2023.

(Continued)

*Primary Examiner* — Ana M Vazquez
(74) *Attorney, Agent, or Firm* — GLOBAL IP COUNSELORS, LLP

(57) ABSTRACT

A solid-state refrigeration apparatus includes a solid cooling structure, first and second heat exchangers, a heating medium circuit, a reciprocating conveying mechanism, and a thermal storage section. The solid cooling portion includes a solid refrigerant substance, an internal channel where the solid refrigerant substance is disposed, and an induction section configured to cause the solid refrigerant substance to produce a caloric effect. The heating medium circuit is connected to the first and second heat exchangers, and the internal channel. The heating medium heated by the solid cooling portion dissipates heat in the first heat exchanger and the heating medium cooled by the solid cooling portion absorbs heat in the second heat exchanger a heat application operation. Frost on the second heat exchanger is melted using the heat stored in the thermal storage section in a defrosting operation. The thermal storage section stores heat in the heat application operation.

20 Claims, 30 Drawing Sheets

(58) Field of Classification Search
CPC ...... F25B 2400/24; F25B 47/02; F25B 13/00; F25B 41/20; F25B 41/40; F25B 47/025; F25B 49/00; Y02B 30/00; Y02E 60/14
See application file for complete search history.

(56) References Cited

U.S. PATENT DOCUMENTS

| | | | | |
|---|---|---|---|---|
| 2016/0025385 | A1* | 1/2016 | Auringer | F25B 21/00 62/3.1 |
| 2016/0273795 | A1 | 9/2016 | Takenaka et al. | |

FOREIGN PATENT DOCUMENTS

| | | |
|---|---|---|
| EP | 3 379 159 A1 | 9/2018 |
| JP | 1-111174 A | 4/1989 |
| JP | 2004-251594 A | 9/2004 |
| JP | 2009287903 A * | 12/2009 |
| JP | 2011-99672 A | 5/2011 |
| JP | 2016-507714 A | 3/2016 |
| JP | 2019-27611 A | 2/2019 |
| JP | 2019-100592 A | 6/2019 |
| WO | 2012/161447 A2 | 11/2012 |
| WO | 2014/061134 A1 | 4/2016 |
| WO | 2017/085859 A1 | 5/2017 |

OTHER PUBLICATIONS

International Search Report of corresponding PCT Application No. PCT/JP2020/034168 dated Nov. 2, 2020.
International Preliminary Report of corresponding PCT Application No. PCT/JP2020/034168 dated Apr. 7, 2022.

* cited by examiner

FIRST ACTION

SECOND ACTION

THIRD ACTION

FOURTH ACTION

COOLING OPERATION

HEATING OPERATION

DEFROSTING OPERATION

FIFTH ACTION

SIXTH ACTION

COOLING OPERATION

HEATING OPERATION

DEFROSTING OPERATION

HEATING OPERATION

DEFROSTING OPERATION

HEATING OPERATION

DEFROSTING OPERATION

COOLING OPERATION

HEATING OPERATION
(FIRST HEATING ACTION)

HEATING OPERATION
(SECOND HEATING ACTION)

DEFROSTING OPERATION
(FIRST DEFROSTING ACTION)

DEFROSTING OPERATION
(SECOND DEFROSTING ACTION)

COOLING OPERATION

DEFROSTING OPERATION
(FIRST DEFROSTING ACTION)

DEFROSTING OPERATION
(SECOND DEFROSTING ACTION)

COOLING OPERATION

HEATING OPERATION
(FIRST HEATING ACTION)

HEATING OPERATION
(SECOND HEATING ACTION)

DEFROSTING OPERATION

COOLING OPERATION

HEATING OPERATION
(FIRST HEATING ACTION)

HEATING OPERATION
(SECOND HEATING ACTION)

DEFROSTING OPERATION

SOLID-STATE REFRIGERATION APPARATUS

CROSS-REFERENCE TO RELATED APPLICATIONS

This is a continuation of International Application No. PCT/JP2020/034168 filed on Sep. 9, 2020, which claims priority to Japanese Patent Application No. 2019-175532, filed on Sep. 26, 2019. The entire disclosures of these applications are incorporated by reference herein.

BACKGROUND

Field of Invention

The present disclosure relates to a solid-state refrigeration apparatus.

Background Information

A magnetic refrigeration apparatus disclosed in Japanese Translation of PCT International Application No. 2016-507714 includes a plurality of beds, a high-temperature heat exchanger, and a low-temperature heat exchanger. The beds, the high-temperature heat exchanger, and the low-temperature heat exchanger are connected to a heating medium circuit. Variations in the magnetic field of a magnetic working substance in each bed cause the magnetic working substance to generate or absorb heat. A heating medium in the heating medium circuit is heated by the magnetic working substance generating heat. Alternatively, the heating medium in the heating medium circuit is cooled by the magnetic working substance absorbing heat. Such an action makes a temperature difference between the heating medium in the high-temperature heat exchanger and the heating medium in the low-temperature heat exchanger.

The heating medium of the low-temperature heat exchanger is low. Thus, frost may form on the surface of the low-temperature heat exchanger. In Japanese Translation of PCT International Application No. 2016-507714, the heating medium accumulated in the high-temperature heat exchanger is transferred to the low-temperature heat exchanger to defrost the low-temperature heat exchanger.

SUMMARY

A first aspect of the present disclosure relates to a solid-state refrigeration apparatus including a solid cooling structure, at least one first heat exchanger, at least one second heat exchanger, a heating medium circuit, a reciprocating conveying mechanism configured to reciprocally convey a heating medium in the heating medium circuit; and a thermal storage section. The solid cooling portion includes a solid refrigerant substance, an internal channel where the solid refrigerant substance is disposed, and an induction section configured to cause the solid refrigerant substance to produce a caloric effect. The heating medium circuit is connected to the first heat exchanger, the second heat exchanger, and the internal channel. The solid-state refrigeration apparatus is configured to perform a heat application operation in which the heating medium heated by the solid cooling portion dissipates heat in the first heat exchanger and the heating medium cooled by the solid cooling portion absorbs heat in the second heat exchanger, and a defrosting operation in which frost on the second heat exchanger is melted. The thermal storage section is configured to store heat in the heat application operation. In the defrosting operation, the frost on the second heat exchanger is melted using the heat stored in the thermal storage section.

BRIEF DESCRIPTION OF THE DRAWINGS

FIG. 4A illustrates a first action, and FIG. 4B illustrates a second action.

FIG. 5A illustrates a third action, and FIG. 5B illustrates a fourth action.

FIG. 13A illustrates a fifth action and FIG. 13B illustrates a sixth action.

DETAILED DESCRIPTION OF EMBODIMENT(S)

Embodiments of the present disclosure will be described below with reference to the drawings. Note that the following description of embodiments is merely beneficial examples in nature, and is not intended to limit the scope, application, or uses of the present disclosure.

First Embodiment

A magnetic refrigeration apparatus (1) according to this embodiment controls the temperature of a heating medium using a magnetocaloric effect. The magnetic refrigeration apparatus (1) is a solid-state refrigeration apparatus configured to control the temperature of a heating medium using a caloric effect. The magnetic refrigeration apparatus (1) is applied to an air conditioner, for example. The magnetic refrigeration apparatus (1) controls the temperature of air in an air-conditioning target space. The air-conditioning target space is an indoor space. The magnetic refrigeration apparatus (1) switches between a cooling operation and a heating operation.

Figure 1:
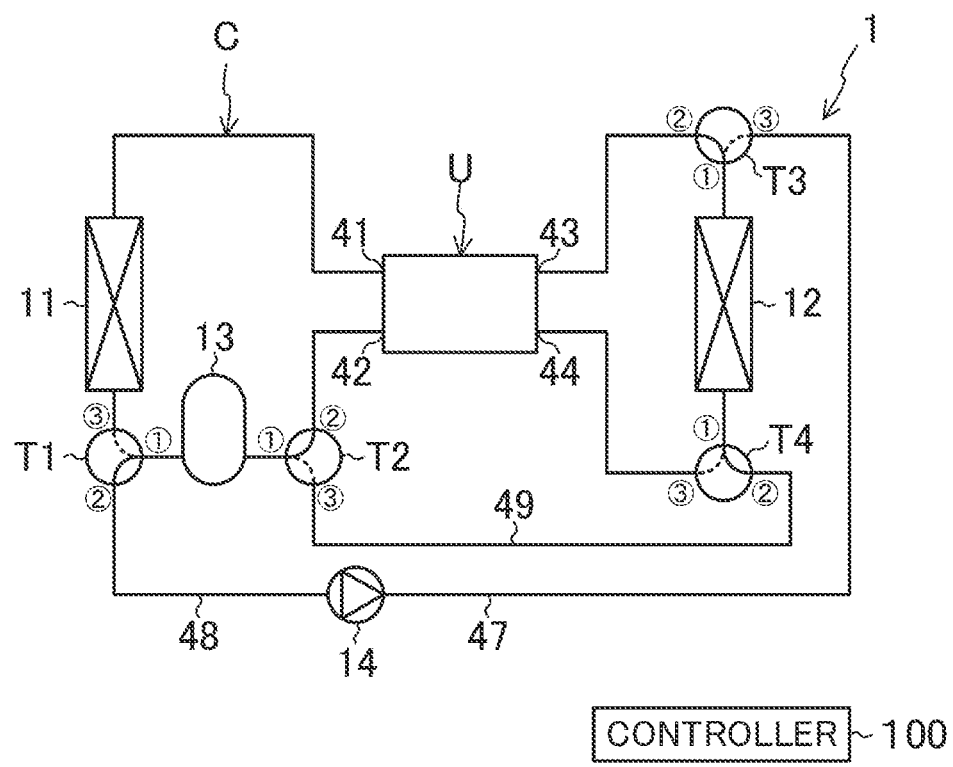
FIG. 1 is a piping system diagram of a magnetic refrigeration apparatus according to a first embodiment.

As illustrated in FIG. 1, the magnetic refrigeration apparatus (1) includes a heating medium circuit (C) filled with the heating medium. The heating medium filling the heating medium circuit (C) is conveyed through the heating medium circuit (C). Examples of the heating medium include a refrigerant, water, brine, etc.

The magnetic refrigeration apparatus (1) includes a magnetic refrigeration unit (U), an indoor heat exchanger (11), an outdoor heat exchanger (12), a tank (13), a pump (14), a switching mechanism (15), and a controller (100). In this embodiment, the indoor heat exchanger (11) corresponds to a first heat exchanger, and the outdoor heat exchanger (12) corresponds to a second heat exchanger. The tank (13) corresponds to a thermal storage section. The pump (14) corresponds to a conveying section.

Magnetic Refrigeration Unit

Figure 2:
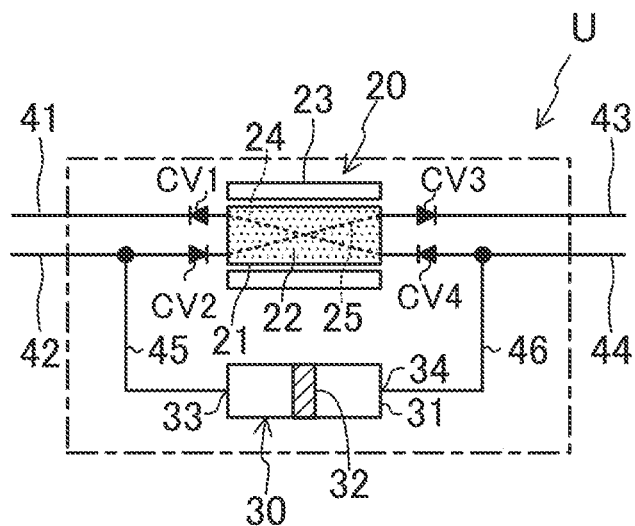
FIG. 2 illustrates a general configuration of a magnetic refrigeration unit according to the first embodiment.

As illustrated in FIG. 2, the magnetic refrigeration unit (U) includes a magnetic refrigerator (20) serving as a solid-state refrigerator, a reciprocating pump (30), a first outflow pipe (41), a first inflow pipe (42), a second outflow pipe (43), a second inflow pipe (44), a first pump-side pipe (45), and a second pump-side pipe (46). The first outflow pipe (41) corresponds to a first outflow section, and the first inflow pipe (42) corresponds to a first inflow section. The second outflow pipe (43) corresponds to a second outflow section, and the second inflow pipe (44) corresponds to a second inflow section.

The magnetic refrigerator (20) includes a bed (21), a magnetic working substance (22) serving as a solid working substance, and a magnetic field modulator (23) serving as an induction section. The bed (21) is a hollow case or column. The interior of the bed (21) is filled with the magnetic working substance (22).

The magnetic working substance (22) generates heat if a magnetic field is applied to the magnetic working substance (22) or if the intensity of the applied magnetic field increases. The magnetic working substance (22) absorbs heat if the magnetic field is removed from the magnetic working substance (22) or if the intensity of the applied magnetic field decreases. Examples of the material of the magnetic working substance (22) include $Gd_5(Ge_{0.5}Si_{0.5})_4$, $La(Fe_{1-x}Si_x)_{13}$, $La(Fe_{1-x}Co_xSi_y)_{13}$, $La(Fe_{1-x})Si_x)_{13}H_y$, and $Mn(As_{0.9}Sb_{0.1})$.

Figure 3:
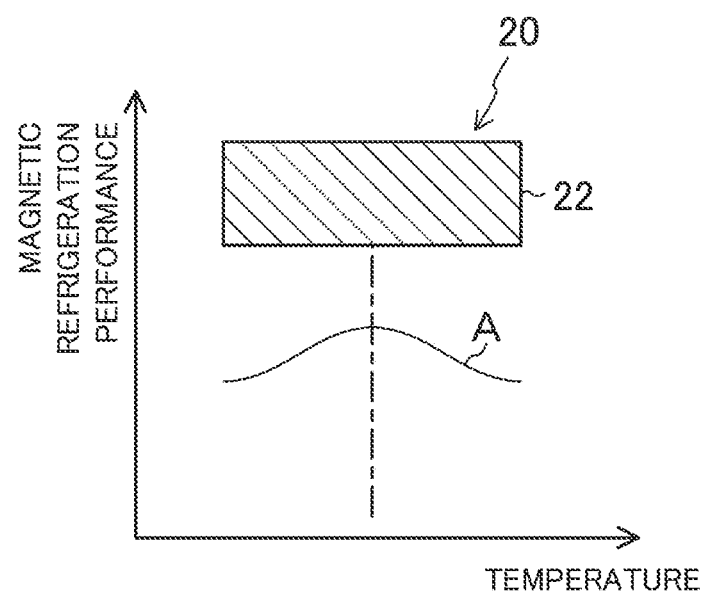
FIG. 3 schematically shows the relation between the temperature and magnetic refrigeration performance of a single-level magnetic refrigerator according to the first embodiment.

The magnetic refrigerator (20) of this embodiment is of a single-level type. The magnetic refrigerator (20) includes the magnetic working substance (22) of one type. The one type of magnetic working substance (22) has a relation such as one indicated by the curve A shown in FIG. 3, for example, between the temperature and magnetic refrigeration performance. In one preferred embodiment, the Curie temperature of this one type of magnetic working substance (22) is set to be the average temperature of the heating medium flowing through the internal channel (24, 25). The Curie temperature is the temperature at which the magnetic working substance (22) has the highest magnetic refrigeration performance.

The magnetic field modulator (23) controls the intensity of the magnetic field applied to the magnetic working substance (22). The magnetic field modulator (23) is an induction section configured to cause the magnetic working substance (22) serving as a solid refrigerant substance to produce a caloric effect. The magnetic field modulator (23) is comprised of an electromagnet capable of modulating a magnetic field, for example. The magnetic field modulator (23) performs a first modulation operation and a second modulation operation. In the first modulation operation, a magnetic field is applied to the magnetic working substance (22), or the intensity of the applied magnetic field is increased. In the second modulation operation, the magnetic field applied to the magnetic working substance (22) is removed, or the intensity of the applied magnetic field is reduced.

A first internal channel (24) and a second internal channel (25) are formed in the bed (21). The first outflow pipe (41) is connected to one end of the first internal channel (24). The second inflow pipe (44) is connected to the other end of the first internal channel (24). The first inflow pipe (42) is connected to one end of the second internal channel (25). The second outflow pipe is connected to the other end of the second internal channel (25).

The first outflow pipe (41) is provided with a first check valve (CV1). The first inflow pipe (42) is provided with a second check valve (CV2). The second outflow pipe (43) is provided with a third check valve (CV3). The second inflow pipe (44) is provided with a fourth check valve (CV4).

The first check valve (CV1) allows the heating medium to flow from the first internal channel (24) of the magnetic refrigerator (20) toward the indoor heat exchanger (11), and prohibits the heating medium from flowing in the opposite direction. The second check valve (CV2) allows the heating medium to flow from the indoor heat exchanger (11) toward the second internal channel (25) of the magnetic refrigerator (20), and prohibits the heating medium from flowing in the opposite direction. The third check valve (CV3) allows the heating medium to flow from the second internal channel (25) of the magnetic refrigerator (20) toward the outdoor heat exchanger (12), and prohibits the heating medium from flowing in the opposite direction. The fourth check valve (CV4) allows the heating medium to flow from the outdoor heat exchanger (12) to the first internal channel (24) of the magnetic refrigerator (20), and prohibits the heating medium from flowing in the opposite direction.

The reciprocating pump (30) reciprocally conveys the heating medium in the heating medium circuit (C). The reciprocating pump (30) corresponds to a reciprocating conveying mechanism. The reciprocating pump (30) is configured as a piston pump. The reciprocating pump (30) includes a pump case (31), a piston (32), and a driving mechanism (not shown). The piston (32) is disposed inside the pump case (31). The piston (32) partitions the inside of the pump case (31) into two chambers. The reciprocating pump (30) has a first port (33) and a second port (34). One of the chambers of the pump case (31) communicates with the first port (33), and the other chamber communicates with the second port (34).

One end of the first pump-side pipe (45) is connected to the first port (33). The other end of the first pump-side pipe (45) is connected to a portion of the first inflow pipe (42) upstream of the second check valve (CV2). One end of the second pump-side pipe (46) is connected to the second port (34). The other end of the second pump-side pipe (46) is connected to a portion of the second inflow pipe (44) upstream of the fourth check valve (CV4).

The driving mechanism includes a rod coupled to the piston (32), a crank coupled to the rod, and an electric motor configured to drive the crank. In response to the rotation of the crank by the electric motor, the rod moves forward and backward. This allows the piston (32) to reciprocate inside the pump case (31).

Specifically, the reciprocating pump (30) alternately and repeatedly performs a first conveying action and a second conveying action. In the first conveying action (FIGS. 4(A) and 5(A)), the piston (32) moves toward the first port (33). The heating medium is thus discharged from the first port (33). The discharged heating medium sequentially flows through the first inflow pipe (42), the second internal channel (25), and the second outflow pipe (43). In the second conveying action (FIGS. 4(B) and 5(B)), the piston (32) moves toward the second port (34). The heating medium is thus discharged from the second port (34). The discharged heating medium sequentially flows through the second inflow pipe (44), the first internal channel (24), and the first outflow pipe (41).

Indoor Heat Exchanger

The indoor heat exchanger (11) illustrated in FIG. 1 is a utilization heat exchanger. The indoor heat exchanger (11) transfers heat between the heating medium and indoor air. One end of the indoor heat exchanger (11) is connected through a pipe to the first outflow pipe (41). The other end of the indoor heat exchanger (11) is connected through a pipe to a third port of a first three-way valve (T1).

Outdoor Heat Exchanger

The outdoor heat exchanger (12) is a heat source heat exchanger. The outdoor heat exchanger (12) transfers heat between the heating medium and outdoor air. One end of the outdoor heat exchanger (12) is connected through a pipe to a first port of a third three-way valve (T3). The other end of the outdoor heat exchanger (12) is connected through a pipe to a first port of a fourth three-way valve (T4).

Tank

The tank (13) is a container for retaining the heating medium. The tank (13) has two ports. One of these ports is connected through a pipe to a first port of the first three-way valve (T1). The other one of these ports is connected through a pipe to a first port of a second three-way valve (T2).

In the heating medium circuit (C) of this embodiment, the tank (13) is downstream of the indoor heat exchanger (11) in the heating operation.

Pump

The pump (14) conveys the heating medium. Specifically, in a defrosting operation, which will be described later in detail, the pump (14) conveys the heating medium in the tank (13) to the outdoor heat exchanger (12) that is a defrosting target. One end of a discharge pipe (47) is connected to the discharge side of the pump (14). The other end of the discharge pipe (47) is connected to a third port of the third three-way valve (T3). One end of a suction pipe (48) is connected to the suction side of the pump (14). The other end of the suction pipe (48) is connected to a second port of the first three-way valve (T1).

Switching Mechanism

The switching mechanism (15) switches between the channels of the heating medium in the heating medium circuit (C). The switching mechanism (15) switches between the channels of the heating medium at least for the heating and defrosting operations. The switching mechanism (15) of this embodiment switches between the channels of the heating medium for the cooling, heating, and defrosting operations. The switching mechanism (15) is configured by various types of valves.

Specifically, the switching mechanism (15) includes the first three-way valve (T1), the second three-way valve (T2), the third three-way valve (T3), and the fourth three-way valve (T4). Each of the three-way valves (T1, T2, 13, T4) has the first, second, and third ports. In the drawings, the first port of each three-way valve is denoted by an encircled numeral "1"; the second port of the three-way valve is denoted by an encircled numeral "2"; and the third port of the three-way valve is denoted by an encircled numeral "3."

Each of the three-way valves (T1, T2, T3, T4) switches between a first state (the state indicated by the solid curve in FIG. 1) and a second state (the state indicated by the dotted curve in FIG. 1). The three-way valve (T1, T2, T3, T4) in the first state makes the first and second ports communicate with each other. The three-way valve (T1, T2, T3, T4) in the second state makes the first and third ports communicate with each other.

The first port of the first three-way valve (T1) communicates with the tank (13). The second port of the first three-way valve (T1) communicates with the suction pipe (48). The third port of the first three-way valve (T1) communicates with the indoor heat exchanger (11).

The first port of the second three-way valve (T2) communicates with the tank (13). The second port of the second three-way valve (T2) communicates with the first inflow pipe (42). The third port of the second three-way valve (T2) is connected to one end of a relay pipe (49).

The first port of the third three-way valve (T3) communicates with the outdoor heat exchanger (12). The second port of the third three-way valve (T3) communicates with the second outflow pipe (43). The third port of the third three-way valve (T3) communicates with the discharge pipe (47).

The first port of the fourth three-way valve (T4) communicates with the outdoor heat exchanger (12). The second port of the fourth three-way valve (T4) is connected to the other end of the relay pipe (49). The third port of the fourth three-way valve (T4) communicates with the second inflow pipe (44).

Controller

The controller (100) controls the magnetic refrigeration apparatus (1). The controller (100) includes a microcomputer and a memory device (specifically, a semiconductor memory) storing software for operating the microcomputer.

Figure 6:
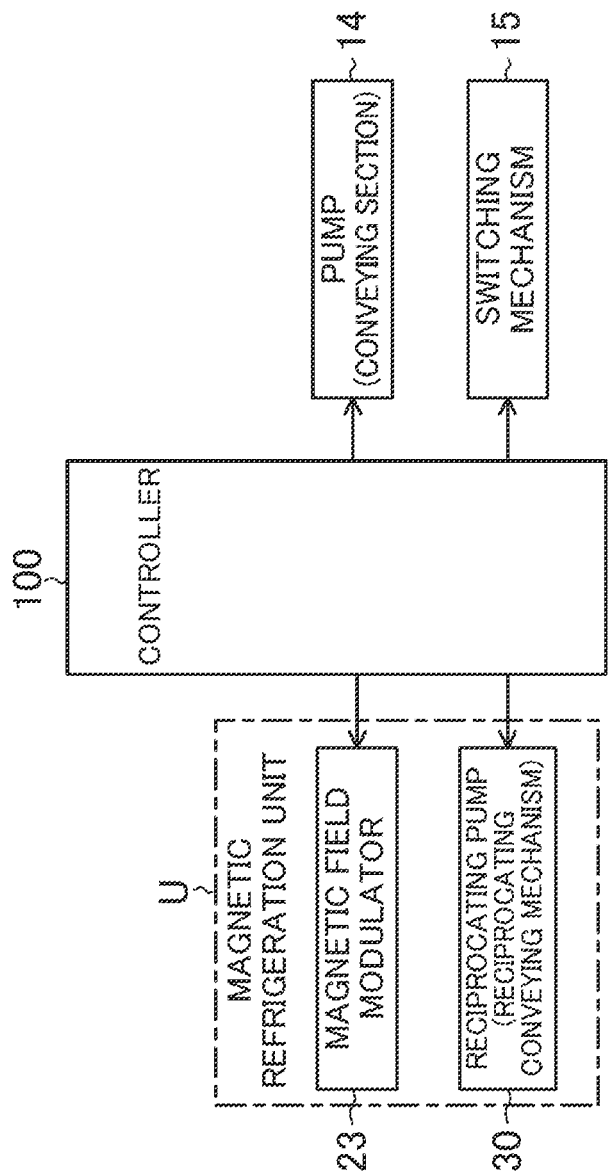
FIG. 6 is a block diagram showing the relation between a controller and a plurality of devices that exchange signals with the controller.

As shown in FIG. 6, the controller (100) is connected to the magnetic refrigeration unit (U), the pump (14), and the switching mechanism (15) via telecommunication lines. The controller (100) controls the magnetic field modulator (23), the reciprocating pump (30), the pump (14), and the switching mechanism (15).

Operation of Magnetic Refrigeration Apparatus

The magnetic refrigeration apparatus (1) performs the cooling operation, the heating operation, and the defrosting operation. In the cooling operation, air in an indoor space is cooled. The cooling operation corresponds to a refrigerating operation. In the heating operation, air in the indoor space is heated. The heating operation corresponds to a heat application operation. In the defrosting operation, frost on the outdoor heat exchanger (12) is melted. Each of these operations will be described in detail.

Cooling Operation

The magnetic refrigeration unit (U) alternately repeats first and second actions.

Figure 4A:
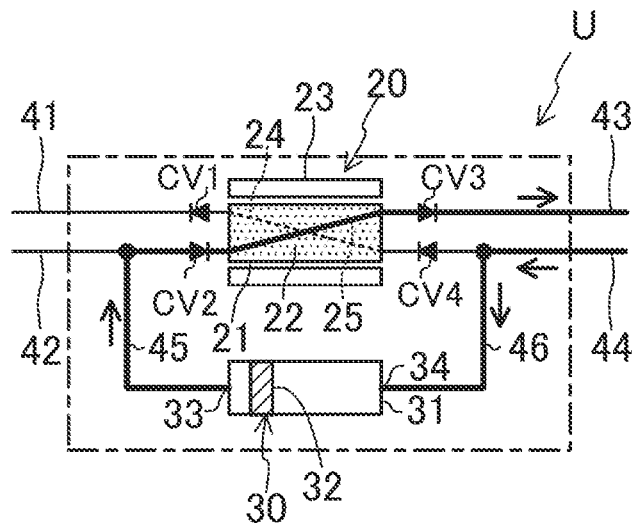
FIG. 4A and FIG. 4B illustrate a general configuration of the magnetic refrigeration unit according to the first embodiment.

As illustrated in FIG. 4A, in the first action, the first modulation operation of the magnetic field modulator (23) and the first conveying action of the reciprocating pump (30) are simultaneously performed. In the first action, the heating medium is heated in the second internal channel (25) of the magnetic refrigerator (20). The heated heating medium flows out of the second outflow pipe (43). At the same time, the heating medium in the heating medium circuit (C) flows into the second port (34) of the pump case (31).

Figure 4B:
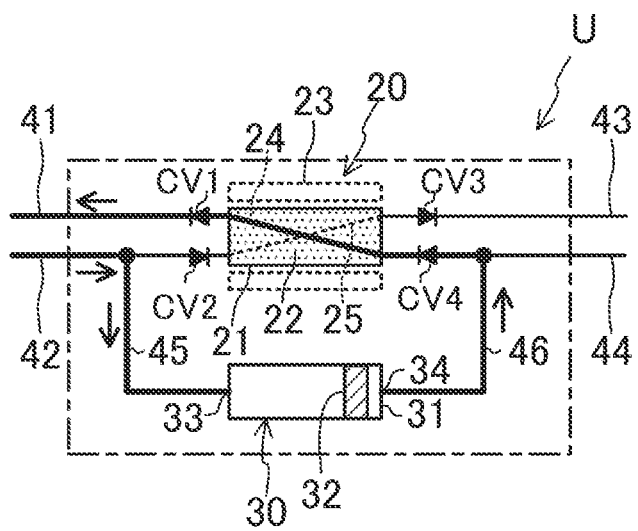

As illustrated in FIG. 4B, in the second action, the second modulation operation of the magnetic field modulator (23) and the second conveying action of the reciprocating pump (30) are simultaneously performed. In the second action, the heating medium is cooled in the first internal channel (24) of the magnetic refrigerator (20). The cooled heating medium flows out of the first outflow pipe (41). At the same time, the heating medium in the heating medium circuit (C) flows into the first port (33) of the pump case (31).

In the cooling operation, the first and second actions are alternately repeated every one second or so.

Figure 7:
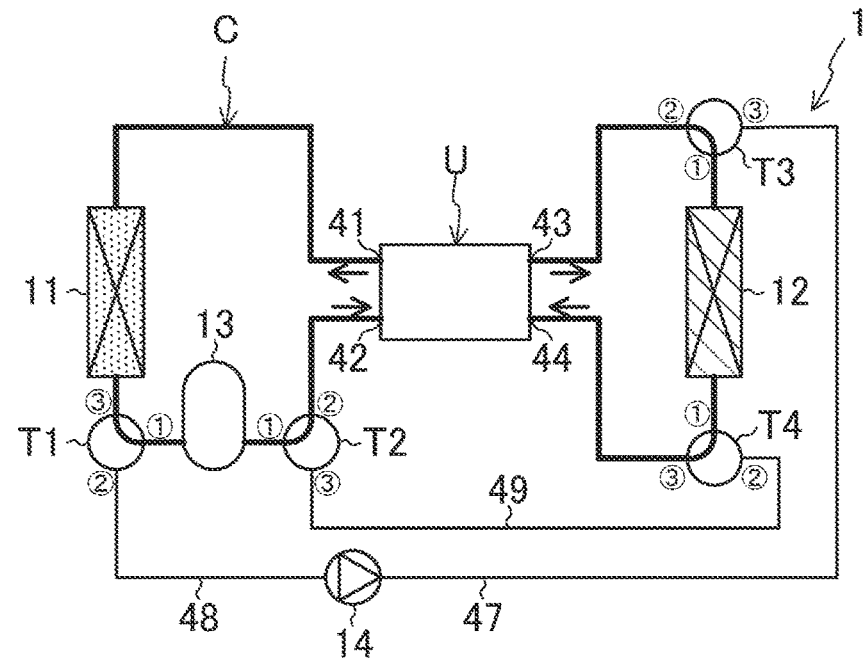
FIG. 7 is a piping system diagram of the magnetic refrigeration apparatus according to the first embodiment, for illustrating a cooling operation.

In the cooling operation illustrated in FIG. 7, the first three-way valve (T1) is set to the second state; the second three-way valve (T2) is set to the first state: the third three-way valve (T3) is set to the first state; and the fourth three-way valve (T4) is set to the second state. The pump (14) is paused.

In the cooling operation, the switching mechanism (15) forms a channel that allows the heating medium cooled by the magnetic refrigerator (20) to flow through the first outflow pipe (41), the indoor heat exchanger (11), and the first inflow pipe (42) and allows the heating medium heated by the magnetic refrigerator (20) to flow through the second outflow pipe (43), the outdoor heat exchanger (12), and the second inflow pipe (44).

For convenience, the flows of the heating medium during the first and second actions are illustrated in the same associated drawings. In the drawings, one of the first and second heat exchangers (indoor and outdoor heat exchangers) (11) and (12) in which the heating medium dissipates heat is hatched, and the other heat exchanger in which the heating medium absorbs heat is dotted.

The heating medium heated by the magnetic refrigeration unit (U) passes through the third three-way valve (T3), and then flows through the outdoor heat exchanger (12). The heating medium dissipates heat to the outdoor air in the outdoor heat exchanger (12). The heating medium that has dissipated heat in the outdoor heat exchanger (12) passes through the fourth three-way valve (T4), and then returns to the magnetic refrigeration unit (U).

The heating medium cooled by the magnetic refrigeration unit (U) flows through the indoor heat exchanger (11). The heating medium absorbs heat from indoor air in the indoor heat exchanger (11). As a result, the indoor air is cooled. The heating medium that has absorbed heat in the indoor heat exchanger (11) passes through the first three-way valve (T1), the tank (13), and the second three-way valve (T2), and then returns to the magnetic refrigeration unit (U).

Heating Operation

The magnetic refrigeration unit (U) alternately repeats third and fourth actions.

Figure 5A:
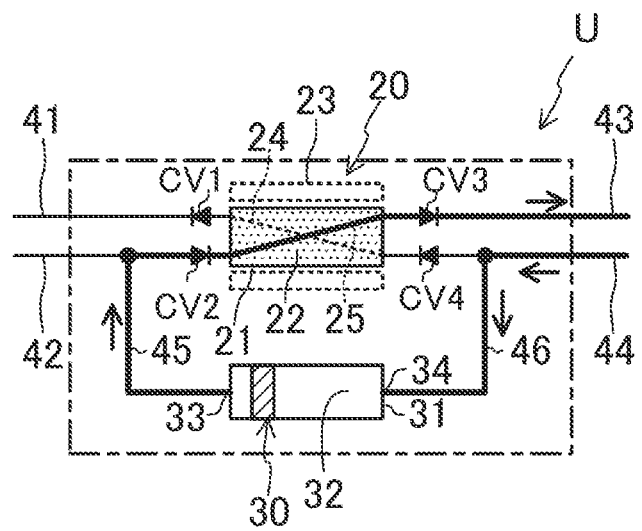
FIG. 5A and FIG. 5B illustrate a general configuration of the magnetic refrigeration unit according to the first embodiment.

As illustrated in FIG. 5A, in the third action, the second modulation operation of the magnetic field modulator (23) and the first conveying action of the reciprocating pump (30) are simultaneously performed. In the third action, the heating medium is cooled in the second internal channel (25) of the magnetic refrigerator (20). The cooled heating medium flows out of the second outflow pipe (43). At the same time, the heating medium in the heating medium circuit (C) flows into the second port (34) of the pump case (31).

Figure 5B:
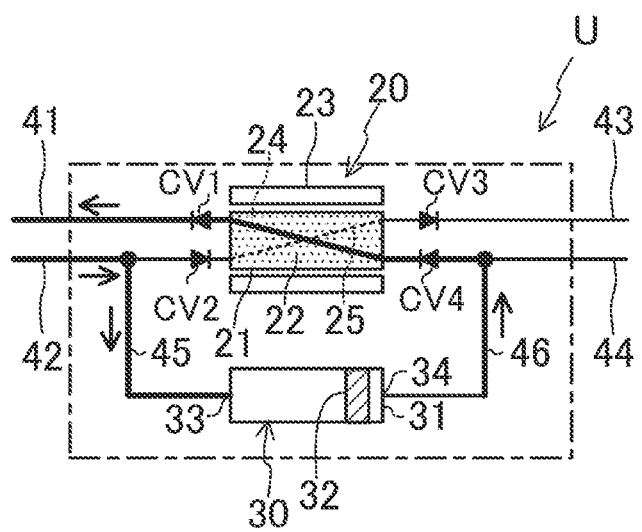

As illustrated in FIG. 5B, in the fourth action, the first modulation operation of the magnetic field modulator (23) and the second conveying action of the reciprocating pump (30) are simultaneously performed. In the fourth action, the heating medium is heated in the first internal channel (24) of the magnetic refrigerator (20). The heated heating medium flows out of the first outflow pipe (41), At the same time, the heating medium in the heating medium circuit (C) flows into the first port (33) of the pump case (31).

In the heating operation, the third and fourth actions are alternately repeated every one second or so.

Figure 8:
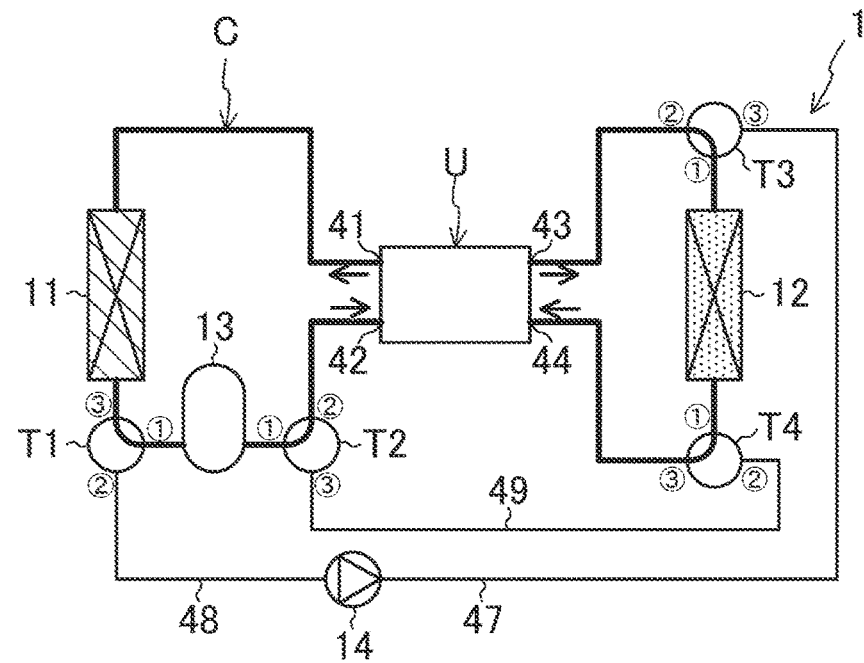
FIG. 8 is a piping system diagram of the magnetic refrigeration apparatus according to the first embodiment, for illustrating a heating operation.

As illustrated in FIG. 8, in the heating operation, the first three-way valve (T1) is set to the second state; the second three-way valve (T2) is set to the first state; the third three-way valve (T3) is set to the first state: and the fourth three-way valve (T4) is set to the second state. The pump (14) is paused.

In the heating operation, the switching mechanism (15) forms a channel that allows the heating medium heated by the magnetic refrigerator (20) to flow through the first outflow pipe (41), the indoor heat exchanger (11), the tank (13) serving as the thermal storage section, and the first inflow pipe (42) and allows the heating medium cooled by the magnetic refrigerator (20) to flow through the second outflow pipe (43), the outdoor heat exchanger (12), and the second inflow pipe (44).

In the heating operation, the heating medium cooled by the magnetic refrigerator (20) in the third action absorbs heat in the outdoor heat exchanger (12), and the heating medium heated by the magnetic refrigerator (20) in the fourth action dissipates heat in the indoor heat exchanger (11).

The heating medium cooled by the magnetic refrigeration unit (U) passes through the third three-way valve (T3), and then flows through the outdoor heat exchanger (12). The heating medium absorbs heat from outdoor air in the outdoor heat exchanger (12). The heating medium that has absorbed heat in the outdoor heat exchanger (12) passes through the fourth three-way valve (T4), and then returns to the magnetic refrigeration unit (U).

The heating medium heated by the magnetic refrigeration unit (U) flows through the indoor heat exchanger (11). The heating medium dissipates heat to indoor air in the indoor heat exchanger (11). As a result, the indoor air is heated. The heating medium that has dissipated heat in the indoor heat exchanger (11) passes through the first three-way valve (T1), the tank (13), and the second three-way valve (T2), and then returns to the magnetic refrigeration unit (U).

In the heating operation, the heating medium heated by the magnetic refrigeration unit (U) is accumulated in the tank (13). In other words, the tank (13) stores the heating medium heated by the magnetic refrigeration unit (U). The tank (13) is disposed downstream of the indoor heat exchanger (11). It is thus possible to reduce the decline in the heating capacity of the indoor heat exchanger (11) due to storing of heat of the heating medium in the tank (13). In particular, the decline in the heating capacity at the start-up of the heating operation can be reduced.

Defrosting Operation

In the heating operation described above, the heating medium absorbs heat from outdoor air in the outdoor heat exchanger (12). Thus, frost may form on the surface of the outdoor heat exchanger (12). If a condition indicating that frost has formed on the surface of the outdoor heat exchanger (12) is satisfied, the magnetic refrigeration apparatus (1) performs the defrosting operation.

Figure 9:
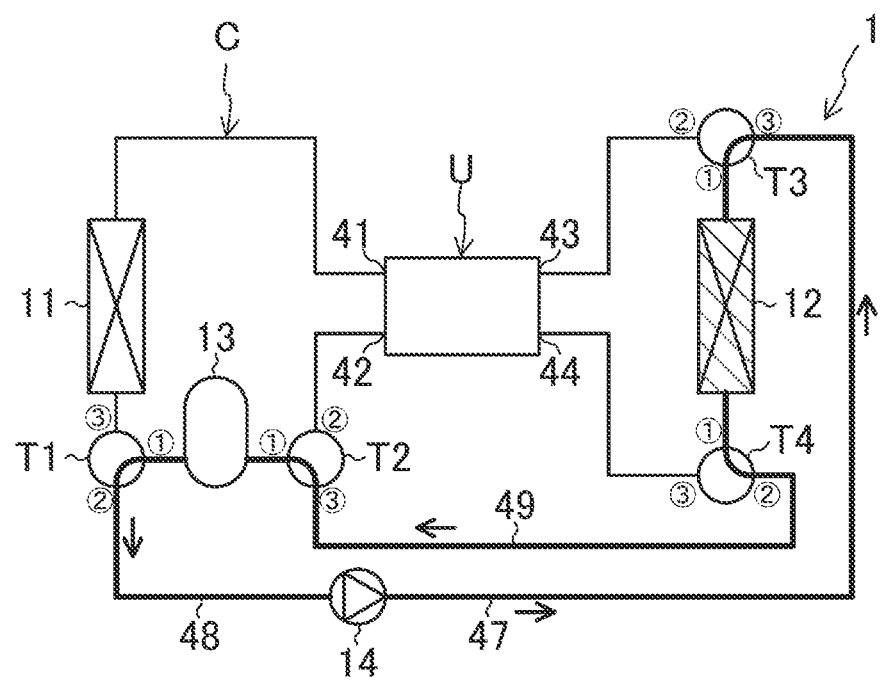
FIG. 9 is a piping system diagram of the magnetic refrigeration apparatus according to the first embodiment, for illustrating a defrosting operation.

In the defrosting operation illustrated in FIG. 9, the magnetic refrigeration unit (U) is paused. In the defrosting operation, the first three-way valve (T1) is set to the first state; the second three-way valve (T2) is set to the second state; the third three-way valve (T3) is set to the second state; and the fourth three-way valve (T4) is set to the first state. The pump (14) operates.

In the defrosting operation, the switching mechanism (15) forms a channel that allows the heating medium in the tank (13) serving as the thermal storage section to flow through the outdoor heat exchanger (12), This channel is a circulation channel including the pump (14), the discharge pipe (47), the outdoor heat exchanger (12), the relay pipe (49), the tank (13), and the suction pipe (48).

When the pump (14) operates, the heating medium in the tank (13) sequentially passes through the first three-way valve (T1), the suction pipe (48), the discharge pipe (47), and the third three-way valve (T3) and then flows through the outdoor heat exchanger (12). The heating medium flowing through the outdoor heat exchanger (12) melts the frost on the surface of the outdoor heat exchanger (12). The heating medium that has been used to defrost the outdoor heat exchanger (12) passes through the fourth three-way valve (T4), and then returns to the tank (13).

As can be seen, in the defrosting operation, the heat stored in the tank (13) in the heating operation is used to defrost the outdoor heat exchanger (12).

Advantages of First Embodiment

A feature of this embodiment is directed to a magnetic refrigeration apparatus including: a magnetic refrigerator (20) including a magnetic working substance (22), an internal channel (24,25) where the magnetic working substance (22) is disposed, and a magnetic field modulator (23) configured to apply a magnetic field variation to the magnetic working substance (22); at least one first heat exchanger (11) (indoor heat exchanger); at least one second heat exchanger (12); a heating medium circuit (C) connected to the first heat exchanger (11), the second heat exchanger (12), and the internal channel (24, 25); and a reciprocating conveying mechanism (30) configured to reciprocally convey a heating medium in the heating medium circuit (C), the magnetic refrigeration apparatus performing a heat application operation in which the heating medium heated by the magnetic refrigerator (20) dissipates heat in the first heat exchanger (11) and the heating medium cooled by the magnetic refrigerator (20) absorbs heat in the second heat exchanger (12), and a defrosting operation in which frost on the second heat exchanger (12) is melted, the magnetic refrigeration apparatus further comprising a thermal storage section (13) configured to store heat in the heat application operation, in the defrosting operation, the frost on the second heat exchanger (12) being incited using the heat stored in the thermal storage section (13).

According to this feature, heat of the heating medium can be stored in the thermal storage section (13) in the heat application operation (heating operation). In the defrosting operation, heat stored in the heating operation is used to defrost the second heat exchanger (outdoor heat exchanger (12)). Thus, a sufficient amount of heat necessary for this defrosting can be secured.

Another feature of this embodiment is as follows: the thermal storage section includes a tank (13) configured to store the heating medium heated by the magnetic refrigerator (20) in the heat application operation; and the magnetic refrigeration apparatus further comprises a conveying section (14) (pump) configured to convey the heating medium in the tank (13) to the second heat exchanger (12) in the defrosting operation.

According to this feature, heat of the heating medium can be stored in the tank (3) in the heating operation. In the defrosting operation, the heating medium stored in the tank (13) in the heating operation can be conveyed to the outdoor heat exchanger (12) by the pump (14). Thus, a sufficient amount of heat required to defrost the outdoor heat exchanger (12) can be secured. In addition, the size of the tank (13) can be changed as appropriate depending on the amount of heat required to defrost the outdoor heat exchanger (12).

Still another feature of this embodiment is that the magnetic refrigeration apparatus further includes: a switching mechanism (15) configured to switch between channels of the heating medium circuit (C) so that the heating medium heated by the magnetic refrigerator (20) flows through the indoor heat exchanger (11) and the thermal storage section (13) in the heat application operation and that the heating medium in the thermal storage section (13) flows through the outdoor heat exchanger (12) in the defrosting operation.

According to this feature, switching can be made between the heating operation in which heat of the heating medium is stored in the thermal storage section (13) and the defrosting operation in which the heating medium in the thermal storage section (13) flows through the outdoor heat exchanger (12).

Yet another feature of this embodiment is that the thermal storage section (13) is disposed on a portion of the heating medium circuit (C) downstream of the first heat exchanger (11) in the heat application operation.

According to this feature, the heating medium heated by the magnetic refrigerator (20) sequentially flows through the indoor heat exchanger (11) and the thermal storage section (13) in the heating operation. It is thus possible to reduce the decline in the heating capacity of the indoor heat exchanger (11) due to storing of heat of the heating medium in the thermal storage section (13). In particular, the temperature of the thermal storage section (13) may be low at the start of the heating operation. In this case, if the heating medium sequentially flows through the thermal storage section (13) and the indoor heat exchanger (11), the start-up time of the heating operation may increase. In contrast, according to this feature, the start-up time of the indoor heat exchanger (11) can be shortened.

A further feature of this embodiment is as follows: the magnetic refrigeration apparatus is configured to further perform a refrigerating operation in which the heating medium cooled by the magnetic refrigerator (20) absorbs heat in the first heat exchanger (11) and the heating medium heated by the magnetic refrigerator (20) dissipates heat in the second heat exchanger (12); the magnetic refrigerator (20) is a single-level magnetic refrigerator including the magnetic working substance (22) of one type; the heating medium circuit (C) includes a first outflow section (41), a first inflow section (42), a second outflow section (43), and a second inflow section (44) each communicating with the internal channel (24, 25) of the magnetic refrigerator (20); the switching mechanism (15) forms a channel in which the heating medium heated by the magnetic refrigerator (20) flows through the first outflow section (41), the first heat exchanger (11), the thermal storage section (13, 16), and the first inflow section (42) and the heating medium cooled by the magnetic refrigerator (20) flows through the second outflow section (43), the second heat exchanger (12), and the second inflow section (44) in the heat application operation, forms a channel in which the heating medium cooled by the magnetic refrigerator (20) flows through the first outflow section (41), the first heat exchanger (11), and the first inflow section (42) and the heating medium heated by the magnetic refrigerator (20) flows through the second outflow section (43), the second heat exchanger (12), and the second inflow section (44) in the refrigerating operation, and forms a channel in which the heating medium in the thermal storage section (13, 16) flows through the second heat exchanger (12) in the defrosting operation.

According to this feature, the magnetic refrigeration apparatus (1) including the single-level magnetic refrigerator (20) can switch among the refrigerating operation, the heat application operation, and the defrosting operation described above.

First Variation of First Embodiment

Figure 10:
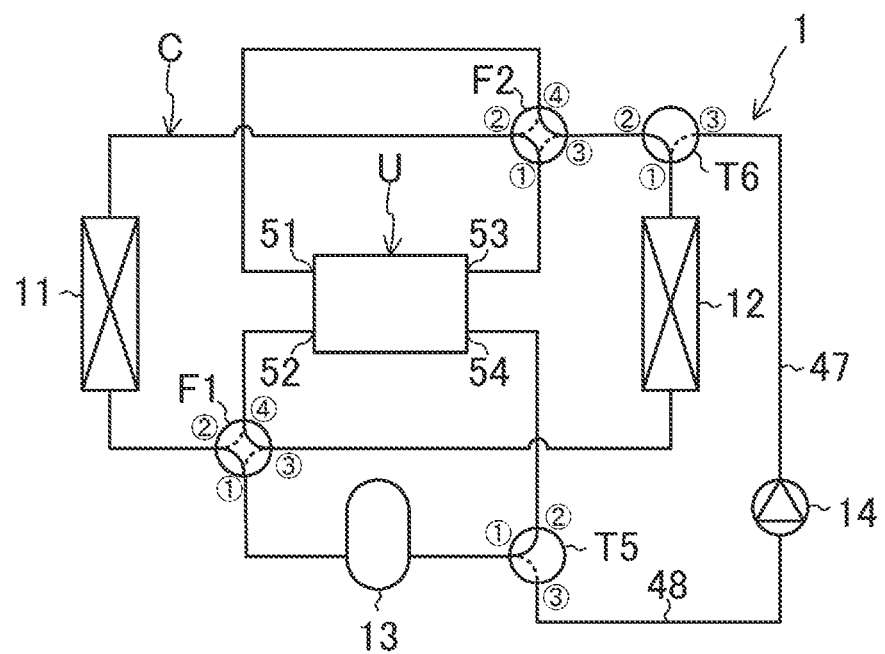
FIG. 10 is a piping system diagram of a magnetic refrigeration apparatus according to a first variation of the first embodiment.
Figure 11:
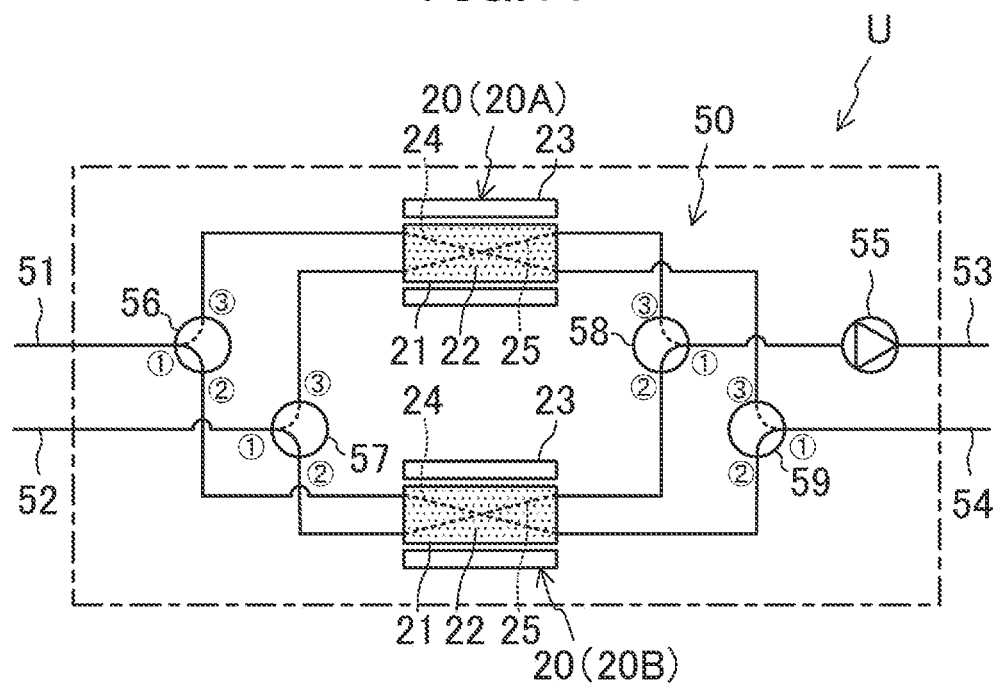
FIG. 11 illustrates a general configuration of a magnetic refrigeration unit according to the first variation of the first embodiment.

In a first variation of the first embodiment, so-called cascaded magnetic refrigerators (20) are used. As illustrated in FIGS. 10 and 11, a configuration of a magnetic refrigeration apparatus (1) according to this variation is different from that of the magnetic refrigeration apparatus (1) of the first embodiment in terms of configurations of a magnetic refrigeration unit (U) and a heating medium circuit (C). Thus, differences from the embodiment will be mainly described below.

As illustrated in FIG. 11, the magnetic refrigeration unit (U) includes two magnetic refrigerators (20). Specifically, the two magnetic refrigerators (20) include a first magnetic refrigerator (20A) and a second magnetic refrigerator (20B). The magnetic refrigerators (20) each include a bed (21) and a magnetic field modulator (23) as in the first embodiment. The magnetic refrigerators (20) each have a first internal channel (24) and a second internal channel (25).

Figure 12:
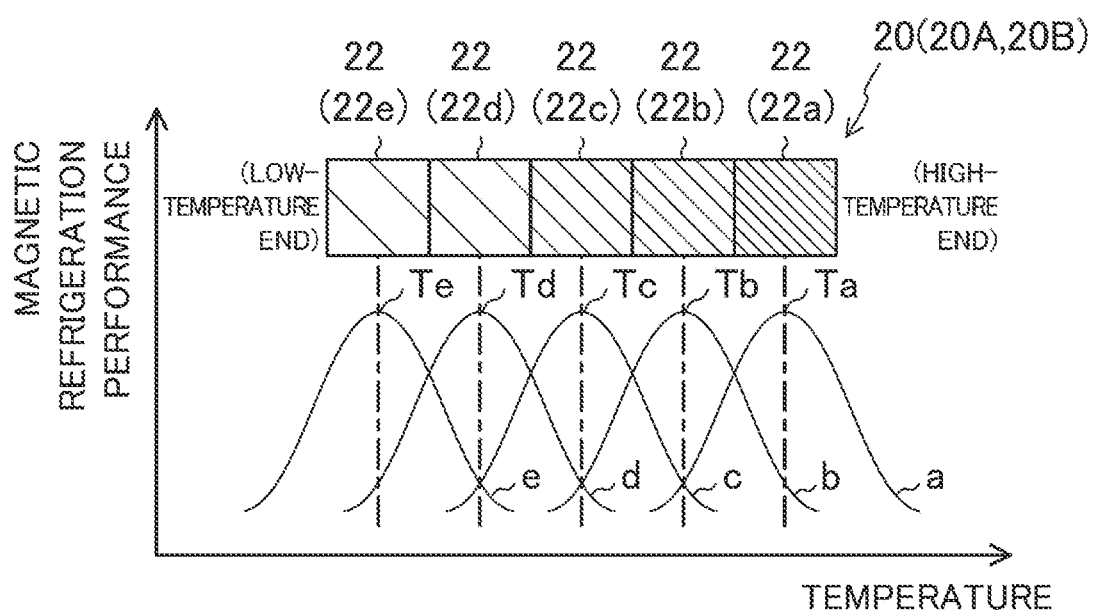
FIG. 12 schematically shows the relation between the temperature and magnetic refrigeration performance of each of cascaded magnetic refrigerators according to the first variation of the first embodiment.

The magnetic refrigerators (20) of this variation are cascaded, and each include a plurality of types of magnetic working substances (22). As shown in FIG. 12, each of the magnetic refrigerators (20) of this variation includes five types of magnetic working substances (22), for example. The magnetic refrigerator (20) includes a first magnetic working substance (22a), a second magnetic working substance (22b), a third magnetic working substance (22c), a fourth magnetic working substance (22d), and a fifth magnetic working substance (22e), which are sequentially arranged from the high-temperature end to the low-temperature end of the magnetic refrigerator (20). The magnetic working substances (22) have different temperatures and different characteristics of magnetic refrigeration performance. Specifically, these magnetic working substances (22) have different Curie temperatures. The relation "Ta>Tb>Tc>Td>Te" is satisfied, where Ta represents the Curie temperature of the first magnetic working substance (22a), Tb represents the Curie temperature of the second magnetic working substance (22b), Tc represents the Curie temperature of the third magnetic working substance (22c), Td represents the Curie temperature of the fourth magnetic working substance (22d), and Te represents the Curie temperature of the fifth magnetic working substance (22e).

The magnetic refrigeration unit (U) includes a low-temperature outflow pipe (51), a low-temperature inflow pipe (52), a high-temperature outflow pipe (53), a high-temperature inflow pipe (54), and a unit-side pump (55), The magnetic refrigeration unit (U) includes a low-temperature first three-way valve (56), a low-temperature second three-way valve (57), a high-temperature first three-way valve (58), and a high-temperature second three-way valve (59). The low-temperature outflow pipe (51) corresponds to a low-temperature outflow section, and the low-temperature inflow pipe (52) corresponds to a low-temperature inflow section. The high-temperature outflow pipe (53) corresponds to a high-temperature outflow section, and the high-temperature inflow pipe (54) corresponds to a high-temperature inflow section.

In this variation, these three-way valves (56, 57, 58, 59) and the unit-side pump (55) form a reciprocating conveying mechanism (50).

The unit-side pump (55) is provided in the high-temperature outflow pipe (53). The unit-side pump (55) is a one-way pump. The unit-side pump (55) conveys a heating medium toward the downstream side of the high-temperature outflow pipe (53).

The configuration of each of the three-way valves (56, 57, 58, 59) is the same as that of each of the three-way valves described above.

A first port of the low-temperature first three-way valve (56) communicates with the low-temperature outflow pipe (51). A second port of the low-temperature first three-way valve (56) communicates with the low-temperature end of the first internal channel (24) of the second magnetic refrigerator (20B). A third port of the low-temperature first three-way valve (56) communicates with the low-temperature end of the first internal channel (24) of the first magnetic refrigerator (20A).

A first port of the low-temperature second three-way valve (57) communicates with the low-temperature inflow pipe (52). A second port of the low-temperature second three-way valve (57) communicates with the low-temperature end of the second internal channel (25) of the second magnetic refrigerator (20B). A third port of the low-temperature second three-way valve (57) communicates with the low-temperature end of the second internal channel (25) of the first magnetic refrigerator (20A).

A first port of the high-temperature first three-way valve (58) communicates with the high-temperature outflow pipe (53). A second port of the high-temperature first three-way valve (58) communicates with the high-temperature end of the second internal channel (25) of the second magnetic refrigerator (20B). A third port of the high-temperature first three-way valve (58) communicates with the high-temperature end of the second internal channel (25) of the first magnetic refrigerator (20A).

A first port of the high-temperature second three-way valve (59) communicates with the high-temperature inflow pipe (54). A second port of the high-temperature second three-way valve (59) communicates with the high-temperature end of the first internal channel (24) of the second magnetic refrigerator (20B). A third port of the high-temperature second three-way valve (59) communicates with the high-temperature end of the first internal channel (24) of the first magnetic refrigerator (20A).

As illustrated in FIG. 10, a switching mechanism (15) of this variation includes a fifth three-way valve (T5), a sixth three-way valve (T6), a first four-way switching valve (F1), and a second four-way switching valve (F2). The configuration of each of the three-way valves (T5, T6) is the same as that of each of the three-way valves described above. Each of the four-way switching valves (F1, F2) has first, second, third, and fourth ports. In the drawings, the first port of each four-way switching valve is denoted by an encircled numeral "1"; the second port of the four-way switching valve is denoted by an encircled numeral "2"; the third port of the four-way switching valve is denoted by an encircled numeral "3"; and the fourth port of the four-way switching valve is denoted by an encircled numeral "4."

Each of the four-way switching valves (F1, F2) switches between a first state (the state indicated by the solid curves in FIG. 1) and a second state (the state indicated by the dotted curves in FIG. 1). The four-way switching valve (F1, F2) in the first state makes the first and second ports communicate with each other, and simultaneously makes the third and fourth ports communicate with each other. The four-way switching valve (F1, F2) in the second state makes the first and third ports communicate with each other, and simultaneously makes the second and fourth ports communicate with each other.

A first port of the fifth three-way valve (T5) communicates with a tank (13). A second port of the fifth three-way valve (T5) communicates with the high-temperature inflow pipe (54). A third port of the fifth three-way valve (T5) communicates with a suction pipe (48).

A first port of the sixth three-way valve (16) communicates with an outdoor heat exchanger (12). A second port of the sixth three-way valve (T6) communicates with the third port of the second four-way switching valve (F2). A third port of the sixth three-way valve (T6) communicates with a discharge pipe (47).

The first port of the first four-way switching valve (F1) communicates with the tank (13). The second port of the first four-way switching valve (F1) communicates with an indoor heat exchanger (11). The third port of the first four-way switching valve (F1) communicates with the outdoor heat exchanger (12). The fourth port of the first four-way switching valve (F1) communicates with the low-temperature inflow pipe (52).

The first port of the second four-way switching valve (F2) communicates with the high-temperature outflow pipe (53). The second port of the second four-way switching valve (F2) communicates with the indoor heat exchanger (11). The fourth port of the second four-way switching valve (F2) communicates with the low-temperature outflow pipe (51).

The magnetic refrigeration apparatus (1) of this variation includes a controller (100) similar to that of the embodiment. The configuration of the controller (100) of this variation is the same as, or similar to, that of the foregoing embodiment. FIG. 10 and associated drawings of other embodiments do not illustrate the controller (100).

Operation of Magnetic Refrigeration Apparatus

The magnetic refrigeration apparatus (1) of the first variation of the first embodiment performs a cooling operation, a heating operation, and a defrosting operation.

Cooling Operation

The magnetic refrigeration unit (U) alternately repeats fifth and sixth actions.

Figure 13A:
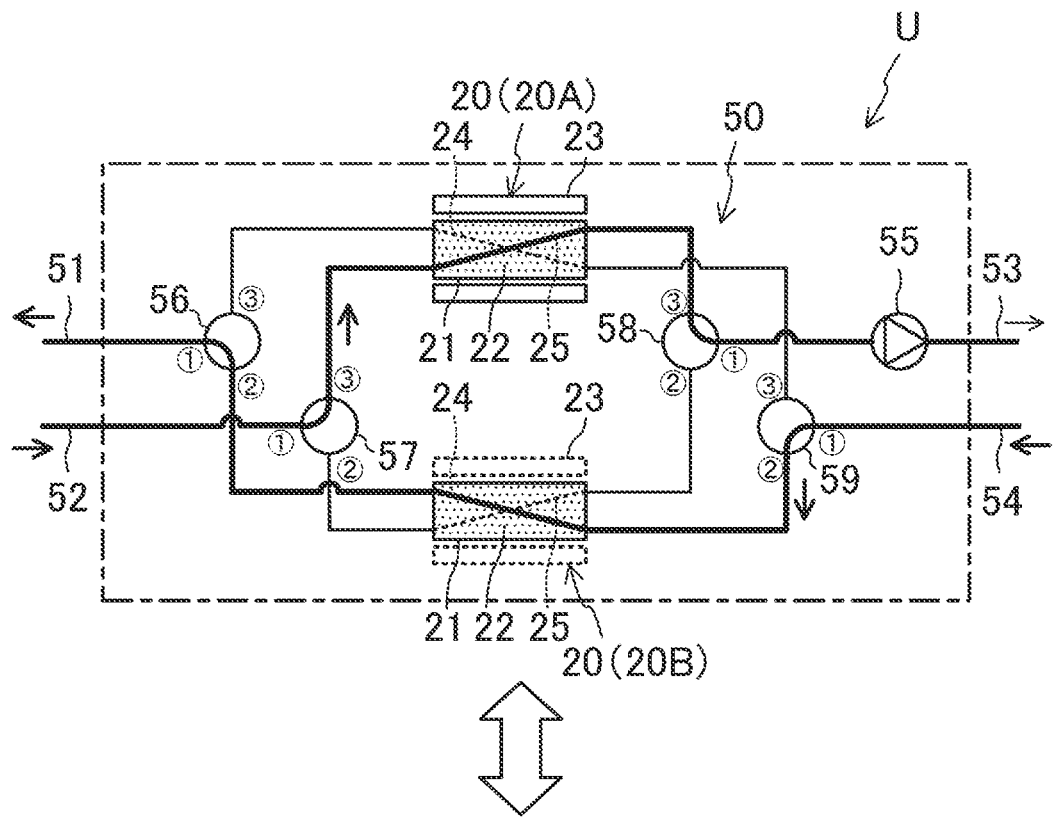
FIG. 13A and FIG. 13B illustrate a general configuration of the magnetic refrigeration unit according to the first variation of the first embodiment.

In the fifth action illustrated in FIG. 13A, the first magnetic refrigerator (20A) performs a first modulation operation, and the second magnetic refrigerator (20B) performs a second modulation operation. The low-temperature first three-way valve (56) is set to the first state; the low-temperature second three-way valve (57) is set to the second state; the high-temperature first three-way valve (58) is set to the second state; and the high-temperature second three-way valve (59) is set to the first state. The unit-side pump (55) operates.

Figure 13B:
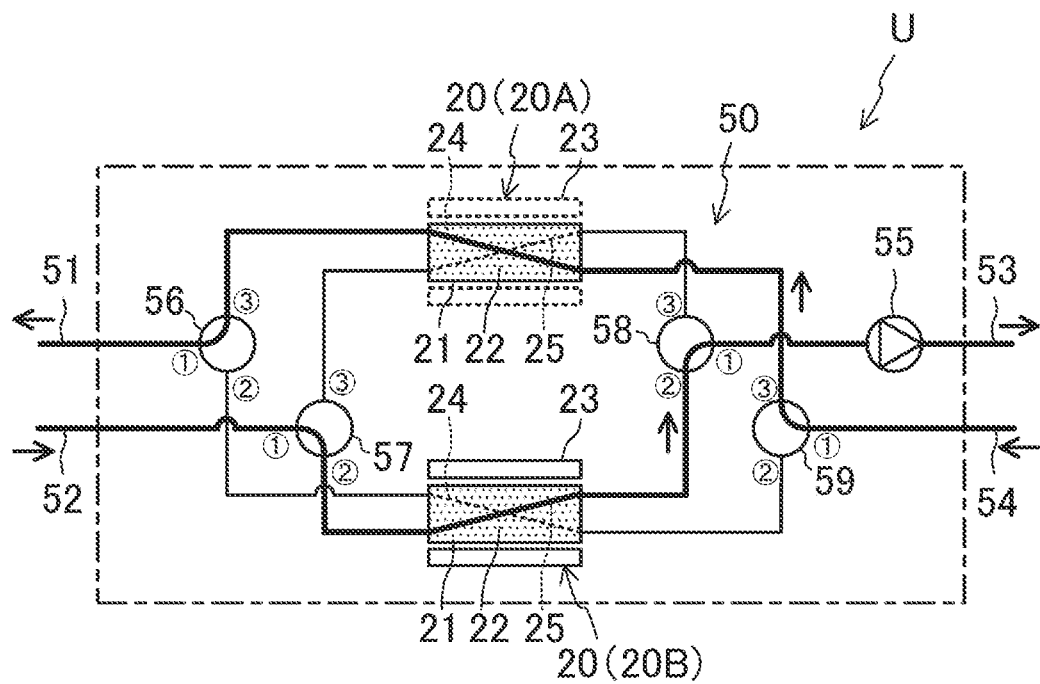

In the sixth action illustrated in FIG. 13B, the first magnetic refrigerator (20A) performs the second modulation operation, and the second magnetic refrigerator (20B) performs the first modulation operation. The low-temperature first three-way valve (56) is set to the second state; the low-temperature second three-way valve (57) is set to the first state; the high-temperature first three-way valve (58) is set to the first state; and the high-temperature second three-way valve (59) is set to the second state. The unit-side pump (55) operates.

Figure 14:
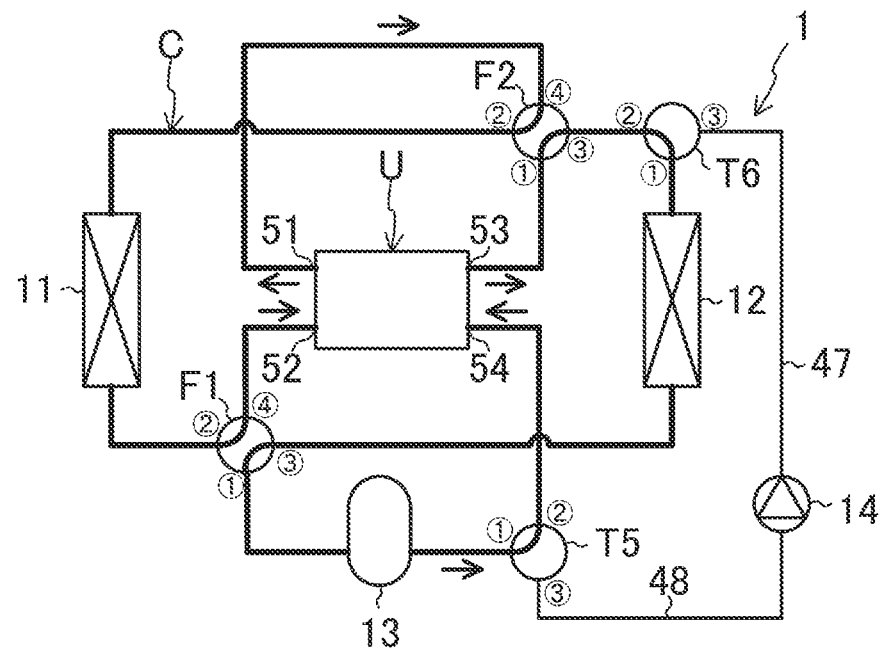
FIG. 14 is a piping system diagram of the magnetic refrigeration apparatus according to the first variation of the first embodiment, for illustrating a cooling operation.

As illustrated in FIG. 14, in the cooling operation, the fifth three-way valve (T5) is set to the first state; the sixth three-way valve (T6) is set to the first state; the first four-way switching valve (F1) is set to the second state; and the second four-way switching valve (F2) is set to the second state.

In the cooling operation, the switching mechanism (15) forms a channel that allows the heating medium cooled by the magnetic refrigerators (20) to flow through the low-temperature outflow pipe (51), the indoor heat exchanger (11), and the low-temperature inflow pipe (52) and allows the heating medium heated by the magnetic refrigerators (20) to flow through the high-temperature outflow pipe (53), the outdoor heat exchanger (12), and the high-temperature inflow pipe (54).

The heating medium heated by the magnetic refrigeration unit (U) passes through the second four-way switching valve (F2) and the sixth three-way valve (T6), and then flows through the outdoor heat exchanger (12). The heating medium dissipates heat to the outdoor air in the outdoor heat exchanger (12). The heating medium that has dissipated heat in the outdoor heat exchanger (12) passes through the first four-way switching valve (F1), the tank (13), and the fifth three-way valve (T5), and then returns to the magnetic refrigeration unit (U).

The heating medium cooled by the magnetic refrigeration unit (U) passes through the second four-way switching valve (F2), and then flows through the indoor heat exchanger (11). The heating medium absorbs heat from indoor air in the indoor heat exchanger (11). As a result, the indoor air is cooled. The heating medium that has absorbed heat in the indoor heat exchanger (11) passes through the first four-way switching valve (F1), and then returns to the magnetic refrigeration unit (U).

Heating Operation

The magnetic refrigeration unit (U) alternately repeats the fifth action illustrated in FIG. 13A and the sixth action illustrated in FIG. 13B.

Figure 15:
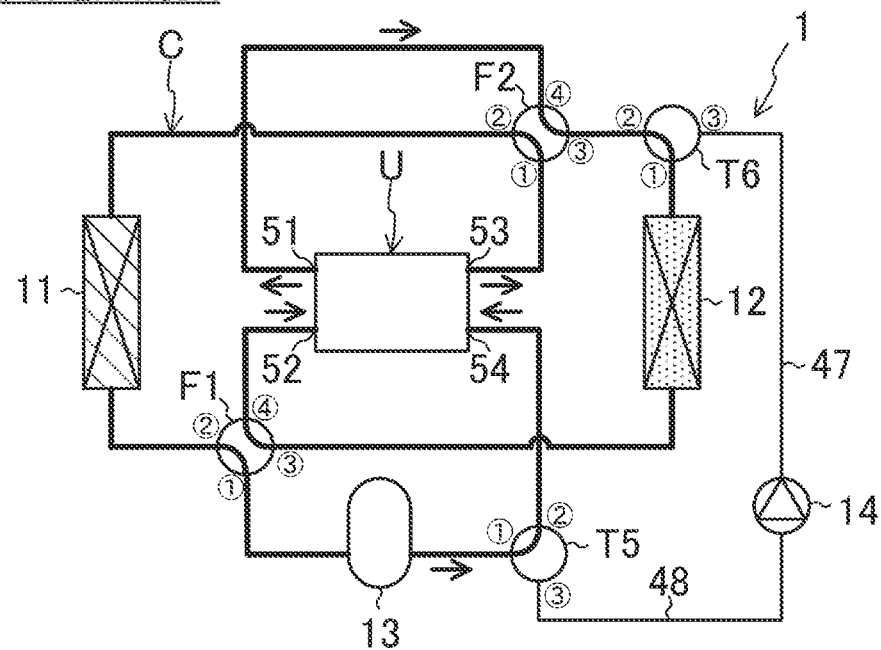
FIG. 15 is a piping system diagram of the magnetic refrigeration apparatus according to the first variation of the first embodiment, for illustrating a heating operation.

As illustrated in FIG. 15, in the heating operation, the fifth three-way valve (T5) is set to the first state; the sixth three-way valve (16) is set to the first state; the first four-way switching valve (F1) is set to the first state; and the second four-way switching valve (F2) is set to the first state.

In the heating operation, the switching mechanism (15) forms a channel that allows the heating medium heated by the magnetic refrigerators (20) to flow through the high-temperature outflow pipe (53), the indoor heat exchanger (11), the tank (13), and the high-temperature inflow pipe (54) and allows the heating medium cooled by the magnetic refrigerators (20) to flow through the low-temperature outflow pipe (51), the outdoor heat exchanger (12), and the low-temperature inflow pipe (52).

The heating medium cooled by the magnetic refrigeration unit (U) passes through the second four-way switching valve (F2) and the sixth three-way valve (T6), and then flows through the outdoor heat exchanger (12). The heating medium absorbs heat from outdoor air in the outdoor heat exchanger (12). The heating medium that has absorbed heat in the outdoor heat exchanger (12) passes through the first four-way switching valve (F1), and then returns to the magnetic refrigeration unit (U).

The heating medium heated by the magnetic refrigeration unit (U) passes through the second four-way switching valve (F2), and then flows through the indoor heat exchanger (11). The heating medium dissipates heat to indoor air in the indoor heat exchanger (11). As a result, the indoor air is heated. The heating medium that has dissipated heat in the indoor heat exchanger (11) passes through the first four-way switching valve (F1), the tank (13), and the fifth three-way valve (T5), and then returns to the magnetic refrigeration unit (U).

In the heating operation, the heating medium heated by the magnetic refrigeration unit (U) is accumulated in the tank (13). In other words, the tank (13) stores heat of the heating medium heated by the magnetic refrigeration unit (U).

Defrosting Operation

Figure 16:
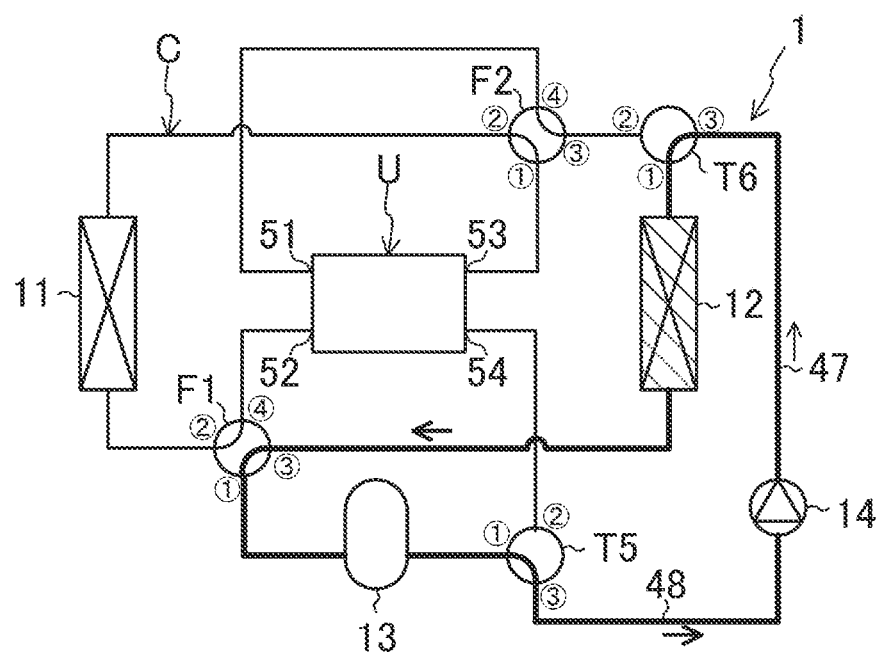
FIG. 16 is a piping system diagram of the magnetic refrigeration apparatus according to the first variation of the first embodiment, for illustrating a defrosting operation.

In the defrosting operation illustrated in FIG. 16, the magnetic refrigeration unit (U) is paused. In the defrosting operation, the fifth three-way valve (T5) is set to the second state, and the sixth three-way valve (T6) is set to the second state. The pump (14) operates.

In the defrosting operation, the switching mechanism (15) forms a channel that allows the heating medium in the tank (13) serving as the thermal storage section to flow through the outdoor heat exchanger (12). This channel is a circulation channel including the pump (14), the discharge pipe (47), the outdoor heat exchanger (12), the tank (13), and the suction pipe (48).

When the pump (14) operates, the heating medium in the tank (13) sequentially passes through the fifth three-way valve (15), the suction pipe (48), the discharge pipe (47), and the sixth three-way valve (T6) and then flows through the outdoor heat exchanger (12). The heating medium flowing through the outdoor heat exchanger (12) melts the frost on the surface of the outdoor heat exchanger (12). The heating medium that has been used to defrost the outdoor heat exchanger (12) passes through the first four-way switching valve (F1), and then returns to the tank (13).

As can be seen, in the defrosting operation, the heat stored in the tank (13) in the heating operation is used to defrost the outdoor heat exchanger (12).

Advantages of First Variation of First Embodiment

A feature of this variation is as follows: the magnetic refrigeration apparatus is configured to further perform a refrigerating operation in which the heating medium cooled by the magnetic refrigerator (20) absorbs heat in the first heat exchanger (11) and the heating medium heated by the magnetic refrigerator (20) dissipates heat in the second heat exchanger (12); the magnetic refrigerator (20) is configured as cascaded magnetic refrigerators including the magnetic working substance (22) of a plurality of types; the heating medium circuit (C) includes a low-temperature outflow section (51), a low-temperature inflow section (52), a high-temperature outflow section (53), and a high-temperature inflow section (54) each communicating with the internal channel (24, 25) of the magnetic refrigerators (20); the switching mechanism (15) forms a channel in which the heating medium heated by the magnetic refrigerators (20) flows through the high-temperature outflow section (53), the first heat exchanger (11), the thermal storage section (13, 16), and the high-temperature inflow section (54) and the heating medium cooled by the magnetic refrigerators (20) flows through the low-temperature outflow section (51), the second heat exchanger (12), and the low-temperature inflow section (52) in the heat application operation, forms a channel in which the heating medium cooled by the magnetic refrigerators (20) flows through the low-temperature outflow section (51), the first heat exchanger (11), and the low-temperature inflow section (52) and the heating medium heated by the magnetic refrigerators (20) flows through the high-temperature outflow section (53), the second heat exchanger (12), and the high-temperature inflow section (54) in the refrigerating operation, and forms a channel in which the heating medium in the thermal storage section (13, 16) flows through the second heat exchanger (12) in the defrosting operation.

According to this feature, the magnetic refrigeration apparatus (1) including the cascaded magnetic refrigerators (20) can switch among the refrigerating operation, the heat application operation, and the defrosting operation described above.

Second Variation of First Embodiment

Figure 17:
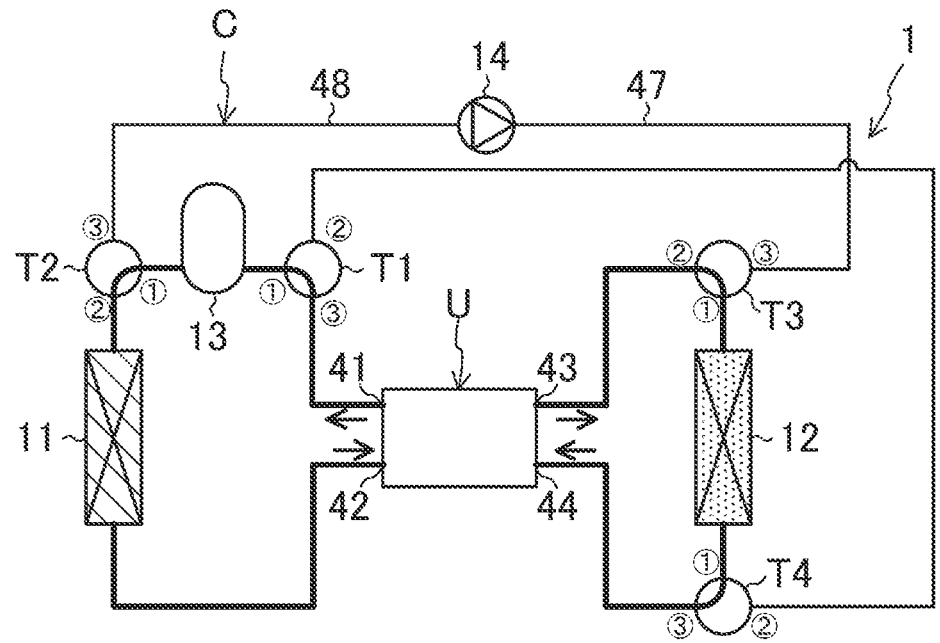
FIG. 17 is a piping system diagram of a magnetic refrigeration apparatus according to a second variation of the first embodiment, for illustrating a heating operation.

A second variation of the first embodiment is different from the first embodiment in the configuration of the heating medium circuit (C). The configuration of a magnetic refrigeration unit (U) of this variation is the same as, or similar to, that of the first embodiment. A magnetic refrigerator (20) of this variation is of a single-level type. As illustrated in FIG. 17, in the heating medium circuit (C) of this variation, a first three-way valve (T1), a tank (13), and a second three-way valve (T2) is upstream of an indoor heat exchanger (11) in a heating operation.

In the heating operation illustrated in FIG. 17, the first three-way valve (T1) is set to the second state; the second three-way valve (T2) is set to the first state; a third three-way valve (T3) is set to the first state; and a fourth three-way valve (T4) is set to the second state. The magnetic refrigeration unit (U) alternately performs third and fourth actions. A pump (14) is paused.

A heating medium heated by the magnetic refrigeration unit (U) passes through the first three-way valve (T1), the tank (13), and the second three-way valve (T2), and then flows through an indoor heat exchanger (11). The tank (13) is disposed upstream of the indoor heat exchanger (11). Thus, heat of the heating medium can be reliably stored in the tank (13). The heating medium that has dissipated heat in the indoor heat exchanger (11) returns to the magnetic refrigeration unit (U).

The heating medium cooled by the magnetic refrigeration unit (U) passes through the third three-way valve (T3), and then absorbs heat in an outdoor heat exchanger (12). This heating medium passes through the fourth three-way valve (T4), and then returns to the magnetic refrigeration unit (U).

Figure 18:
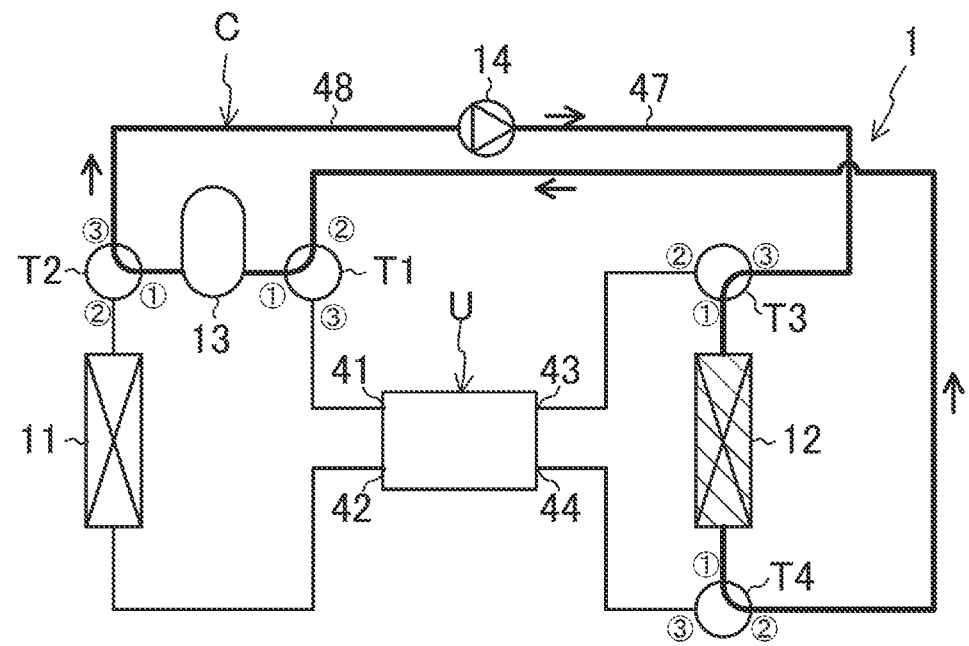
FIG. 18 is a piping system diagram of the magnetic refrigeration apparatus according to the second variation of the first embodiment, for illustrating a defrosting operation.

In the defrosting operation illustrated in FIG. 18, the first three-way valve (T1) is set to the first state; the second three-way valve (T2) is set to the second state; the third three-way valve (T3) is set to the second state; and the fourth three-way valve (T4) is set to the first state. The magnetic refrigeration unit (U) is paused. The pump (14) operates.

The heating medium in the tank (13) sequentially passes through the second three-way valve (T2), the suction pipe (48), the discharge pipe (47), and the third three-way valve (T3), and then flows through the outdoor heat exchanger (12). The heating medium melts frost on the outdoor heat exchanger (12). The heating medium that has been used to defrost the outdoor heat exchanger (12) passes through the fourth three-way valve (T4) and the first three-way valve (T1), and then returns to the tank (13).

Basic operations of the cooling operation are similar to those of the first embodiment, and therefore will not be described in detail.

Third Variation of First Embodiment

Figure 19:
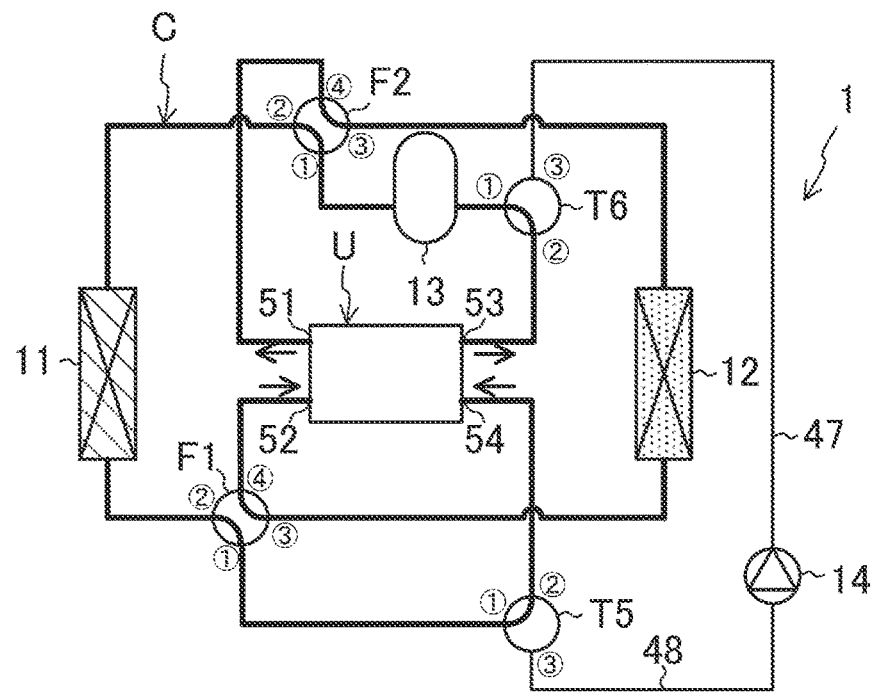
FIG. 19 is a piping system diagram of a magnetic refrigeration apparatus according to a third variation of the first embodiment, for illustrating a heating operation.

A third variation of the first embodiment is different from the first variation of the first embodiment in the configuration of the heating medium circuit (C). The configuration of a magnetic refrigeration unit (U) of this variation is the same as, or similar to, that of the first variation of the first embodiment. Magnetic refrigerators (20) of this variation are cascaded. As illustrated in FIG. 19, in the heating medium circuit (C) of this variation, a sixth three-way valve (T6), a tank (13), and a second four-way switching valve (F2) is upstream of the indoor heat exchanger (11) in a heating operation.

In the heating operation illustrated in FIG. 19, a fifth three-way valve (T5) is set to the first state; the sixth three-way valve (T6) is set to the first state; a first four-way switching valve (F1) is set to the first state; and the second four-way switching valve (F2) is set to the first state. The magnetic refrigeration unit (U) alternately performs fifth and sixth actions. A pump (14) is paused.

The heating medium heated by the magnetic refrigeration unit (U) passes through the sixth three-way valve (T6), the tank (13), and the second four-way switching valve (F2), and then flows through the indoor heat exchanger (11). The tank (13) is disposed upstream of the indoor heat exchanger (11). Thus, heat of the heating medium can be reliably stored in the tank (13). The heating medium that has dissipated heat in the indoor heat exchanger (11) sequentially passes through the first four-way switching valve (F1) and the fifth three-way valve (T5), and then returns to the magnetic refrigeration unit (U).

The heating medium cooled by the magnetic refrigeration unit (U) passes through the second four-way switching valve (F2), and then absorbs heat in the outdoor heat exchanger (12). This heating medium passes through the first four-way switching valve (F1), and then returns to the magnetic refrigeration unit (U).

Figure 20:
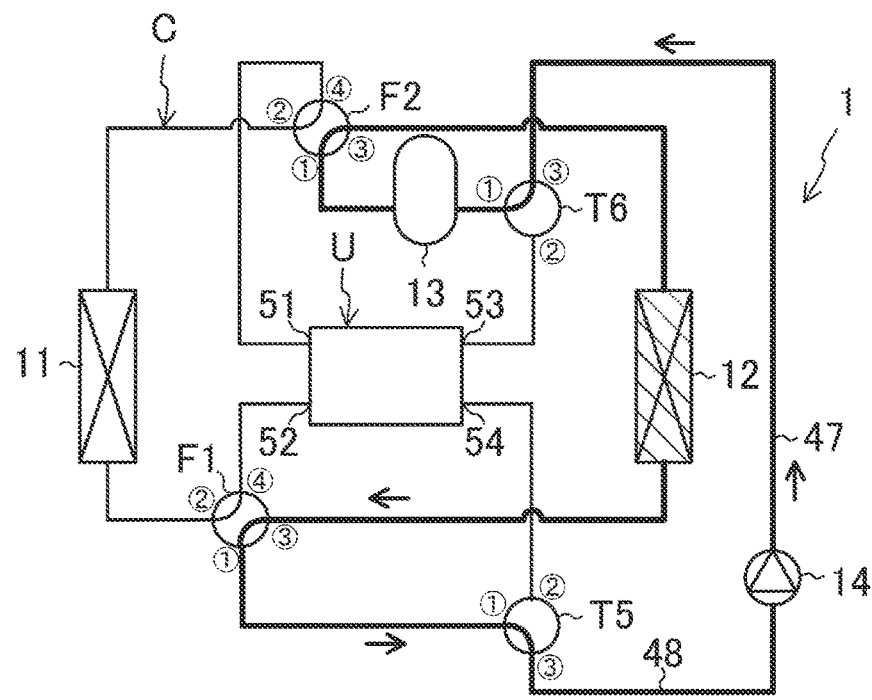
FIG. 20 is a piping system diagram of the magnetic refrigeration apparatus according to the third variation of the first embodiment, for illustrating a defrosting operation.

In the defrosting operation illustrated in FIG. 20, the fifth three-way valve (T5) is set to the second state; the sixth three-way valve (T6) is set to the second state; the first four-way switching valve (F1) is set to the second state; and the second four-way switching valve (F2) is set to the second state. The magnetic refrigeration unit (U) is paused. The pump (14) operates, The heating medium in the tank (13) passes through the second four-way switching valve (F2), and then flows through the outdoor heat exchanger (12). The heating medium melts frost on the outdoor heat exchanger (12). The heating medium that has been used to defrost the outdoor heat exchanger (12) passes through the first four-way switching valve (F1), the fifth three-way valve (T5), and the sixth three-way valve (T6), and then returns to the tank (13).

Basic operations of the cooling operation is similar to those of the first variation of the first embodiment, and therefore will not be described in detail.

Second Embodiment

A magnetic refrigeration apparatus (1) according to a second embodiment includes a plurality of outdoor heat exchangers (12). In a defrosting operation, a defrosting action is performed to individually defrost the plurality of outdoor heat exchangers (12). The configuration of a magnetic refrigeration unit (U) of the second embodiment is the same as, or similar to, that of the first embodiment. The magnetic refrigeration unit (U) includes a single-level magnetic refrigerator (20).

Figure 21:
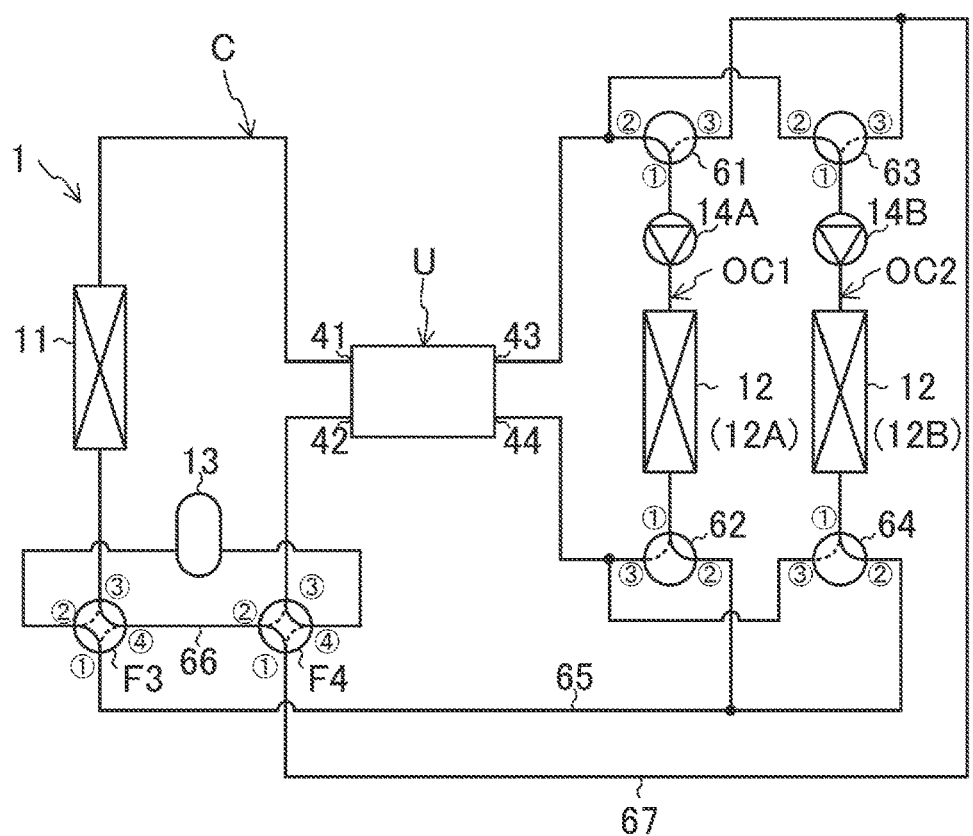
FIG. 21 is a piping system diagram of a magnetic refrigeration apparatus according to a second embodiment.

As illustrated in FIG. 21, a switching mechanism (15) of the second embodiment includes a third four-way switching valve (F3), a fourth four-way switching valve (F4), a first suction three-way valve (61), a first discharge three-way valve (62), a second suction three-way valve (63), and a second discharge three-way valve (64).

A first port of the third four-way switching valve (F3) communicates with a second port of each of the first discharge three-way valve (62) and the second discharge three-way valve (64) through a first relay pipe (65). A second port of the third four-way switching valve (F3) communicates with the tank (13). A third port of the third four-way switching valve (F3) communicates with an indoor heat exchanger (11). A fourth port of the third four-way switching valve (F3) communicates with a second port of the fourth four-way switching valve (F4) through a bypass pipe (66).

The bypass pipe (66) corresponds to a bypass channel that bypasses the tank (13) in a first heating action.

A first port of the fourth four-way switching valve (F4) communicates with a third port of each of the first suction three-way valve (61) and the second suction three-way valve (63) through a second relay pipe (67). A third port of the fourth four-way switching valve (F4) communicates with a first inflow pipe (42). A fourth port of the fourth four-way switching valve (F4) communicates with the tank (13).

A heating medium circuit (C) is connected to two outdoor circuits in parallel. The two outdoor circuits include a first outdoor circuit (OC1) and a second outdoor circuit (OC2). The heating medium circuit (C) may include three or more outdoor circuits.

The first outdoor circuit (OC1) is provided with a first outdoor heat exchanger (12A), a first pump (14A), a first suction three-way valve (61), and a first discharge three-way valve (62). The first outdoor heat exchanger (12A) is disposed on the discharge side of the first pump (14A). The first suction three-way valve (61) is disposed on the suction side of the first pump (14A).

A first port of the first suction three-way valve (61) communicates with the first pump (14A). A second port of the first suction three-way valve (61) communicates with a second outflow pipe (43).

A first port of the first discharge three-way valve (62) communicates with the first outdoor heat exchanger (12A). A third port of the first discharge three-way valve (62) communicates with a second inflow pipe (44).

The second outdoor circuit (OC2) is provided with a second outdoor heat exchanger (12B), a second pump (14B), a second suction three-way valve (63), and a second discharge three-way valve (64). The second outdoor heat exchanger (12B) is disposed on the discharge side of the second pump (14B). The second suction three-way valve (63) is disposed on the suction side of the second pump (14B).

A first port of the second suction three-way valve (63) communicates with the second pump (14B). A second port of the second suction three-way valve (63) communicates with the second outflow pipe (43).

A first port of the second discharge three-way valve (64) communicates with the second outdoor heat exchanger (12B). A third port of the second discharge three-way valve (64) communicates with the second inflow pipe (44).

Operation of Magnetic Refrigeration Apparatus

The magnetic refrigeration apparatus (1) of the second embodiment performs cooling operation, a heating operation, and a defrosting operation. The heating operation includes first and second heating actions. The defrosting operation includes first and second defrosting actions.

Cooling Operation

The magnetic refrigeration unit (U) alternately repeats a first action (FIG. 4A) and a second action (FIG. 4B) as in the first embodiment.

Figure 22:
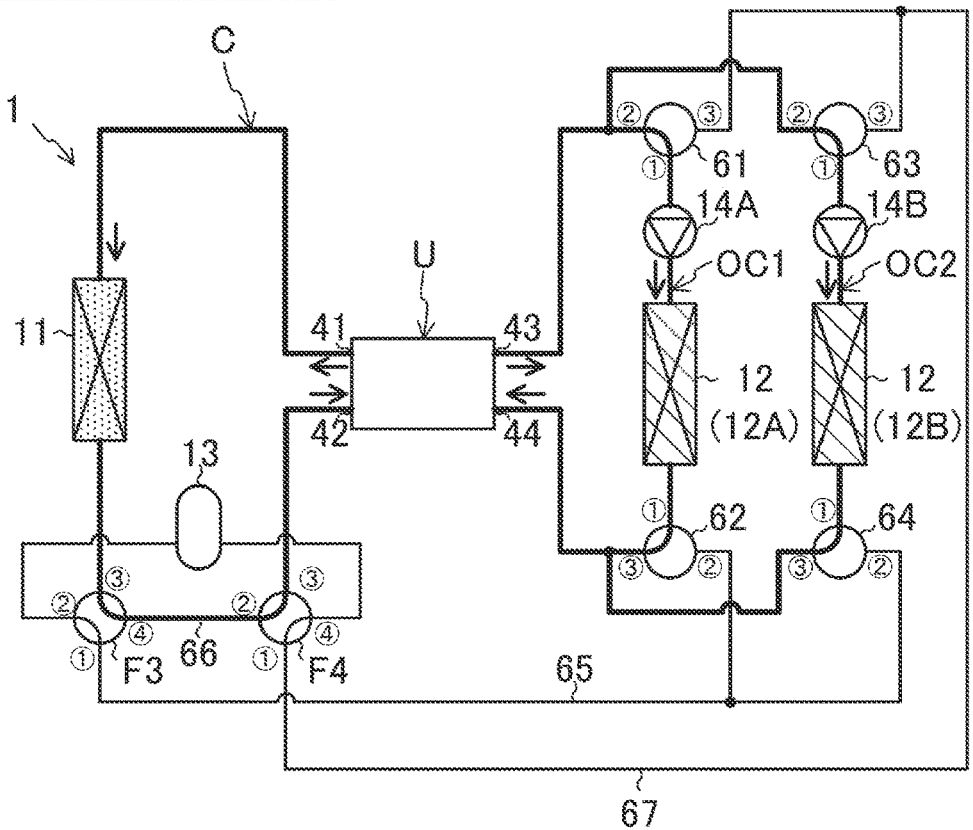
FIG. 22 is a piping system diagram of the magnetic refrigeration apparatus according to the second embodiment, for illustrating a cooling operation.

In the cooling operation illustrated in FIG. 22, the third four-way switching valve (F3) is set to the first state; the fourth four-way switching valve (F4) is set to the second state; the first suction three-way valve (61) is set to the first state; the first discharge three-way valve (62) is set to the second state; the second suction three-way valve (63) is set to the first state; and the second discharge three-way valve (64) is set to the second state. The first pump (14A) and the second pump (14B) are paused. The first pump (14A) and the second pump (14B) may operate.

A heating medium heated by the magnetic refrigeration unit (U) flows through the first outdoor circuit (OC1) and the second outdoor circuit (OC2) in parallel. In the first outdoor circuit (OC1), the heating medium passes through the first suction three-way valve (61), and then dissipates heat in the first outdoor heat exchanger (12A), The heating medium that has dissipated heat in the first outdoor heat exchanger (12A) passes through the first discharge three-way valve (62), and then returns to the magnetic refrigeration unit (U). In the second outdoor circuit (OC2), the heating medium passes through the second suction three-way valve (63), and then dissipates heat in the second outdoor heat exchanger (12B), The heating medium that has dissipated heat in the second outdoor heat exchanger (12B) passes through the second discharge three-way valve (64), and then returns to the magnetic refrigeration unit (U).

The heating medium cooled by the magnetic refrigeration unit (U) flows through the indoor heat exchanger (11). The heating medium absorbs heat from indoor air in the indoor heat exchanger (11). As a result, the indoor air is cooled. The heating medium that has absorbed heat in the indoor heat exchanger (11) passes through the third four-way switching valve (F3), the bypass pipe (66), and the fourth four-way switching; valve (F4), and then returns to the magnetic refrigeration unit (U).

Heating Operation

The heating operation includes first and second heating actions. The first heating action is executed at the start-up of the heating operation. The first heating action is executed during a period from after receipt of a command in a controller (100) to execute the heating operation until satisfaction of the condition under which the heating operation becomes steady is satisfied. This condition is, for example, that the suction temperature of the indoor heat exchanger (11) reaches a predetermined temperature. The second heating action is executed when this condition is satisfied.

First Heating Action

The magnetic refrigeration unit (U) alternately repeats a third action (FIG. 5A) and a fourth action (FIG. 5B) as in the first embodiment.

Figure 23:
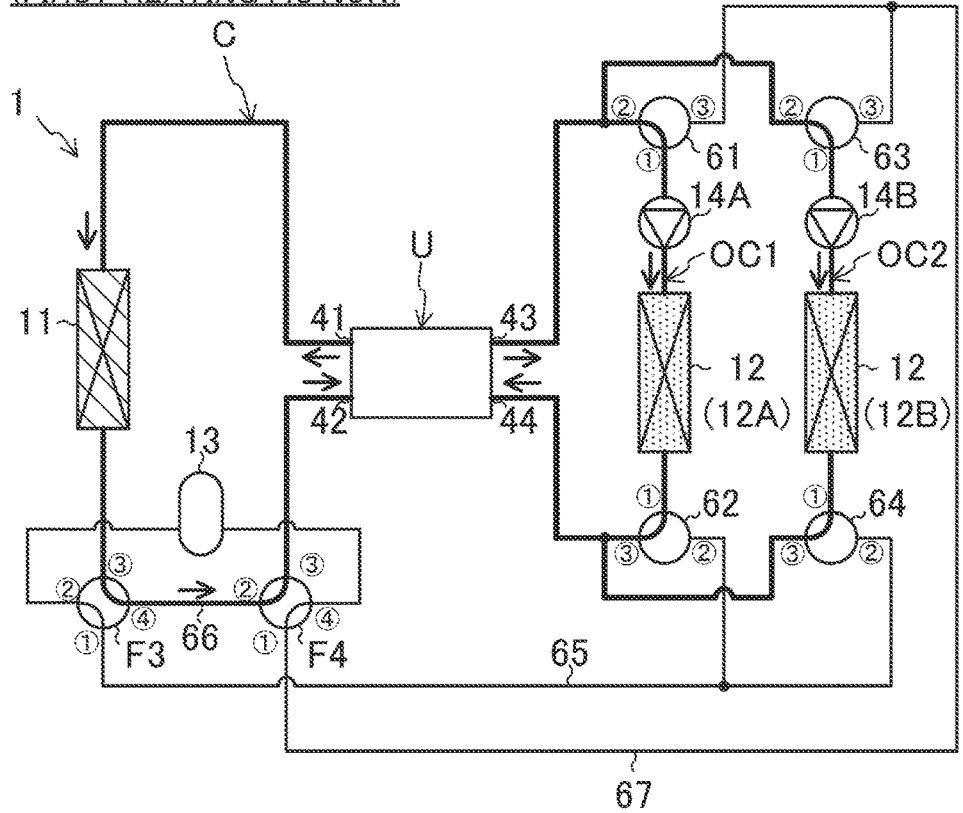
FIG. 23 is a piping system diagram of the magnetic refrigeration apparatus according to the second embodiment, for illustrating a heating operation (a first heating action).

In the first heating action illustrated in FIG. 23, the third four-way switching valve (F3) is set to the first state; the fourth four-way switching valve (F4) is set to the second state; the first suction three-way valve (61) is set to the first state; the first discharge three-way valve (62) is set to the second state; the second suction three-way valve (63) is set to the first state; and the second discharge three-way valve (64) is set to the second state. The first pump (14A) and the second pump (14B) are paused. The first pump (14A) and the second pump (14B) may operate.

The heating medium cooled by the magnetic refrigeration unit (U) flows through the first outdoor circuit (OC1) and the second outdoor circuit (OC2) in parallel. In the first outdoor circuit (OC1), the heating medium passes through the first suction three-way valve (61), and then absorbs heat in the first outdoor heat exchanger (12A). The heating medium that has absorbed heat in the first outdoor heat exchanger (12A) passes through the first discharge three-way valve (62), and then returns to the magnetic refrigeration unit (U). In the second outdoor circuit (OC2), the heating medium passes through the second suction three-way valve (63), and then absorbs heat in the second outdoor heat exchanger (12B), The heating medium that has absorbed heat in the second outdoor heat exchanger (12B) passes through the second discharge three-way valve (64), and then returns to the magnetic refrigeration unit (U).

The heating medium heated by the magnetic refrigeration unit (U) flows through the indoor heat exchanger (11). The heating medium dissipates heat to indoor air in the indoor heat exchanger (11). As a result, the indoor air is heated. The heating medium that has dissipated heat in the indoor heat exchanger (11) flows through the third four-way switching valve (F3), the bypass pipe (66), and the fourth four-way switching valve (F4), and then returns to the magnetic refrigeration unit (U).

As can be seen, in the first heating action, the heating medium heated by the magnetic refrigeration unit (U) bypasses the tank (13), and then returns to the magnetic refrigeration unit (U). Thus, heat of the heating medium is not accumulated in the tank (13). It is therefore possible to improve the heating capacity of the indoor heat exchanger (11) rapidly and shorten the start-up time of the heating operation.

Second Heating Action

The magnetic refrigeration unit (U) alternately repeats the third action (FIG. 5A) and the fourth action (FIG. 5B) as in the first embodiment.

Figure 24:
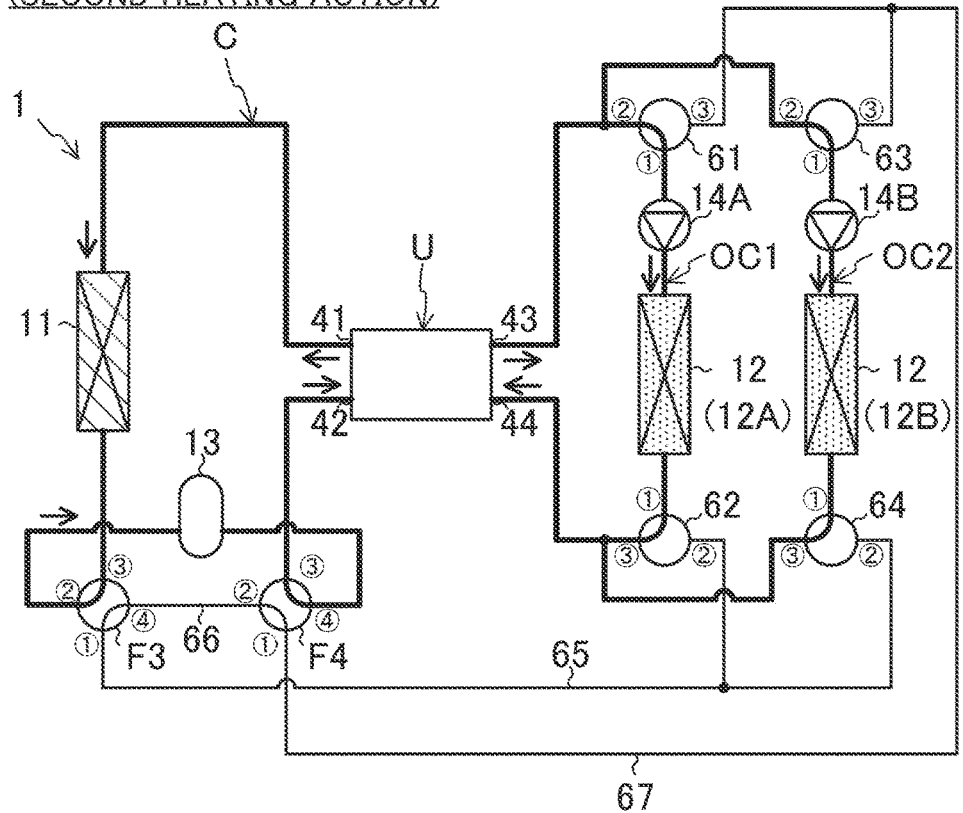
FIG. 24 is a piping system diagram of the magnetic refrigeration apparatus according to the second embodiment, for illustrating the heating operation (a second heating action).

In the second heating action illustrated in FIG. 24, the third four-way switching valve (F3) is set to the second state; the fourth four-way switching valve (F4) is set to the first state; the first suction three-way valve (61) is set to the first state; the first discharge three-way valve (62) is set to the second state; the second suction three-way valve (63) is set to the first state; and the second discharge three-way valve (64) is set to the second state. The first pump (14A) and the second pump (14B) are paused. The first pump (14A) and the second pump (14B) may operate.

The heating medium cooled by the magnetic refrigeration unit (U) flows through the first outdoor circuit (OC1) and the second outdoor circuit (OC2) in parallel. In the first outdoor circuit (OC1), the heating medium passes through the first suction three-way valve (61), and then absorbs heat in the first outdoor heat exchanger (12A). The heating medium that has absorbed heat in the first outdoor heat exchanger (12A) passes through the first discharge three-way valve (62), and then returns to the magnetic refrigeration unit (U). In the second outdoor circuit (OC2), the heating medium passes through the second suction three-way valve (63), and then absorbs heat in the second outdoor heat exchanger (12B). The heating medium that has absorbed heat in the second outdoor heat exchanger (12B) passes through the second discharge three-way valve (64), and then returns to the magnetic refrigeration unit (U).

The heating medium heated by the magnetic refrigeration unit (U) flows through the indoor heat exchanger (11). The heating medium dissipates heat to indoor air in the indoor heat exchanger (11). As a result, the indoor air is heated. The heating medium that has dissipated heat in the indoor heat exchanger (11) flows through the tank (13). Heat of the heating medium is stored in the tank (13). The heating medium that has flowed through the tank (13) returns to the magnetic refrigeration unit (U).

Defrosting Operation

The defrosting operation includes first and second defrosting actions. The outdoor heat exchangers (12) that is a defrosting target and the outdoor heat exchanger (12) that allows the heating medium to absorb heat vary in these defrosting actions. In the defrosting operation of this example, the first defrosting action and the second defrosting action are each performed at least once.

Specifically, in the first defrosting action, the first outdoor heat exchanger (12A) is a defrosting target, and the heating medium absorbs heat in the second outdoor heat exchanger (12B). In the second defrosting action, the second outdoor heat exchanger (12B) is a defrosting target, and the heating medium absorbs heat in the first outdoor heat exchanger (12A). In each of these defrosting actions, the following actions are executed simultaneously: an action in which the heating medium heated by the magnetic refrigerator (20) dissipates heat in the indoor heat exchanger (11) and the heating medium cooled by the magnetic refrigerator (20) absorbs heat in one of the outdoor heat exchangers (12); and an action in which the heating medium in the tank (13) is supplied to the other outdoor heat exchanger (12) that is a defrosting target.

First Defrosting Action

The magnetic refrigeration unit (U) alternately repeats the third action (FIG. 5A) and the fourth action (FIG. 5B) as in the first embodiment.

Figure 25:
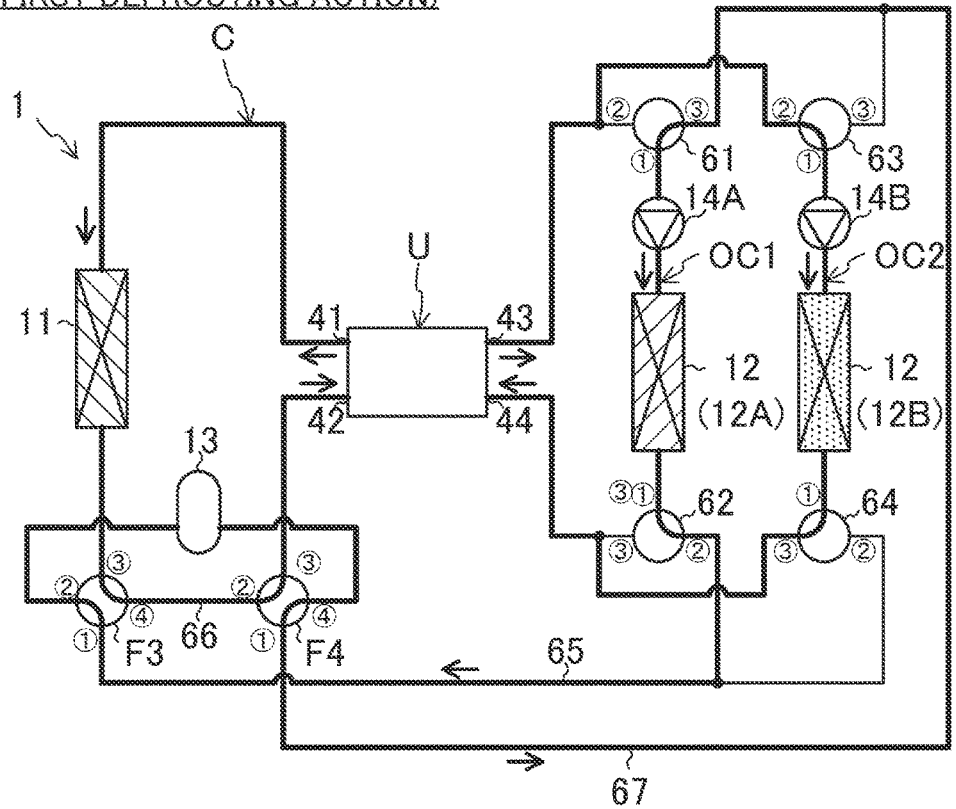
FIG. 25 is a piping system diagram of the magnetic refrigeration apparatus according to the second embodiment, for illustrating a defrosting operation (a first defrosting action).

In the first defrosting action illustrated in FIG. 25, the third four-way switching valve (F3) is set to the first state; the fourth four-way switching valve (F4) is set to the second state; the first suction three-way valve (61) is set to the second state; the first discharge three-way valve (62) is set to the first state; the second suction three-way valve (63) is set to the first state; and the second discharge three-way valve (64) is set to the second state. The first pump (14A) operates. The second pump (14B) is paused. The second pump (14B) may operate.

The heating medium cooled by the magnetic refrigeration unit (U) flows through the second outdoor circuit (OC2). In the second outdoor circuit (OC2), the heating medium passes through the second suction three-way valve (63), and then absorbs heat in the second outdoor heat exchanger (12B). The heating medium that has absorbed heat in the second outdoor heat exchanger (12B) passes through the second discharge three-way valve (64), and then returns to the magnetic refrigeration unit (U).

The heating medium heated by the magnetic refrigeration unit (U) flows through the indoor heat exchanger (11). The heating medium dissipates heat to indoor air in the indoor heat exchanger (11). As a result, the indoor air is heated. The heating medium that has dissipated heat in the indoor heat exchanger (11) flows through the third four-way switching valve (F3), the bypass pipe (66), and the fourth four-way switching valve (F4), and then returns to the magnetic refrigeration unit (U).

The heating medium in the tank (13) passes through the fourth four-way switching valve (F4) and the first suction three-way valve (61), and then flows through the first outdoor heat exchanger (12A). The heating medium flowing through the first outdoor heat exchanger (12A) melts the frost on the surface of the first outdoor heat exchanger (12A). The heating medium that has been used to defrost the first outdoor heat exchanger (12A) passes through the first discharge three-way valve (62) and the third four-way switching valve (F3), and then returns to the tank (13).

Second Defrosting Action

The magnetic refrigeration unit (U) alternately repeats the third action (FIG. 5A) and the fourth action (FIG. 5B) as in the first embodiment.

Figure 26:
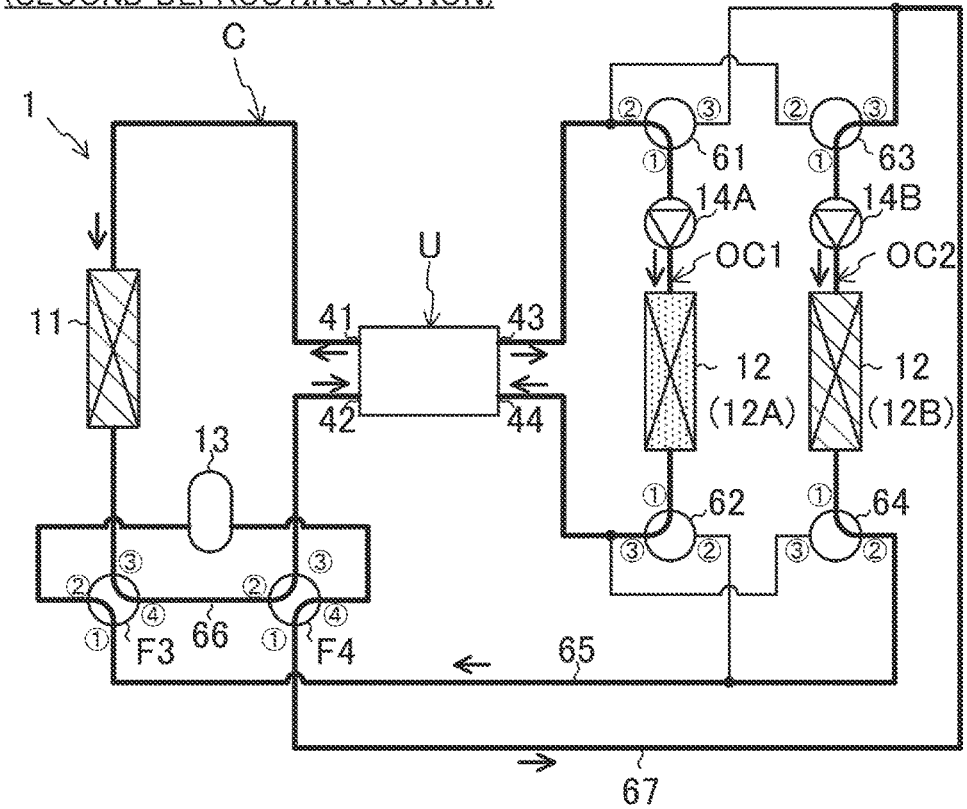
FIG. 26 is a piping system diagram of the magnetic refrigeration apparatus according to the second embodiment, for illustrating the defrosting operation (a second defrosting action).

In the second defrosting action illustrated in FIG. 26, the third four-way switching valve (F3) is set to the first state; the fourth four-way switching valve (F4) is set to the second state; the first suction three-way valve (61) is set to the first state; the first discharge three-way valve (62) is set to the second state; the second suction three-way valve (63) is set to the second state; and the second discharge three-way valve (64) is set to the first state. The second pump (14B) operates. The first pump (14A) is paused. The first pump (14A) may operate.

The heating medium cooled by the magnetic refrigeration unit (U) flows through the first outdoor circuit (OC1). In the first outdoor circuit (OC1), the heating medium passes through the first suction three-way valve (61), and then absorbs heat in the first outdoor heat exchanger (12A). The heating medium that has absorbed heat in the first outdoor heat exchanger (12A) passes through the first discharge three-way valve (62), and then returns to the magnetic refrigeration unit (U).

The heating medium heated by the magnetic refrigeration unit (U) flows through the indoor heat exchanger (11). The heating medium dissipates heat to indoor air in the indoor heat exchanger (11). As a result, the indoor air is heated. The heating medium that has dissipated heat in the indoor heat exchanger (11) flows through the third four-way switching valve (F3), the bypass pipe (66), and the fourth four-way switching valve (F4), and then returns to the magnetic refrigeration unit (U).

The heating medium in the tank (13) passes through the fourth four-way switching valve (F4) and the second suction three-way valve (63), and then flows through the second outdoor heat exchanger (12B). The heating medium flowing through the second outdoor heat exchanger (12B) melts frost on the surface of the second outdoor heat exchanger (12B). The heating medium that has been used to defrost the second outdoor heat exchanger (12B) passes through the second discharge three-way valve (64) and the third four-way switching valve (F3), and then returns to the tank (13).

Advantages of Second Embodiment

A feature of this embodiment is as follows: the at least one second heat exchanger (12) includes a plurality of second heat exchangers (12); the defrosting operation includes a plurality of defrosting actions by which the second heat exchangers (12) that are defrosting targets and the second heat exchangers (12) that allow the heating medium to absorb heat are varied; and in each of the defrosting actions, an action in which the heating medium heated by the magnetic refrigerator (20) dissipates heat in the first heat exchanger (11) and the heating medium cooled by the magnetic refrigerator (20) absorbs heat in one or more of the second heat exchangers (12), and an action in which the heating medium in the thermal storage section (13, 16) is supplied to another one or more of the second heat exchangers (12) which is a defrosting target are simultaneously executed.

According to this feature, the first heat exchanger (11) can heat air while the second heat exchanger (12) that is a defrosting target is defrosted. Specifically, it is possible to continue the heating operation while the outdoor heat exchanger (12) that is a defrosting target is defrosted. In the defrosting operation, the plurality of defrosting actions enable defrosting of all of the outdoor heat exchangers (12).

First Variation of Second Embodiment

Figure 27:
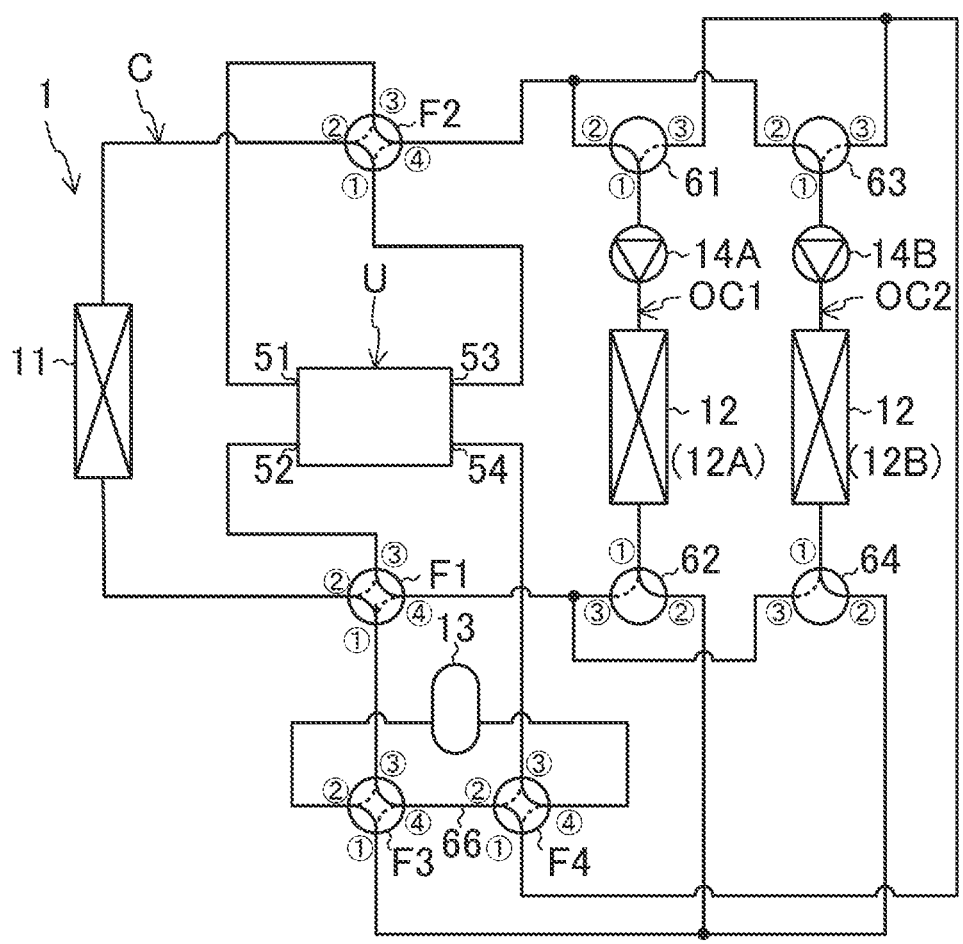
FIG. 27 is a piping system diagram of a magnetic refrigeration apparatus according to a first variation of the second embodiment.

A magnetic refrigeration apparatus (1) according to a first variation of the second embodiment, illustrated in FIG. 27, includes so-called cascaded magnetic refrigerators (20). The configuration of a magnetic refrigeration unit (U) of the first variation of the second embodiment is the same as, or similar to, that of the first variation of the first embodiment.

As in the first variation of the first embodiment, a switching mechanism (15) of this variation includes a first four-way switching valve (F1) and a second four-way switching valve (F2).

A first port of the first four-way switching valve (F1) communicates with a third port of a third four-way switching valve (F3). A second port of the first four-way switching valve (F1) communicates with an indoor heat exchanger (11). A third port of the first four-way switching valve (F1) communicates with a low-temperature inflow pipe (52). A fourth port of the first four-way switching valve (F1) communicates with a third port of each of first and second discharge three-way valves (62) and (64).

A first port of the second four-way switching valve (F2) communicates with a high-temperature outflow pipe (53). A second port of the second four-way switching valve (F2) communicates with the indoor heat exchanger (11). A third port of the second four-way switching valve (F2) communicates with a low-temperature outflow pipe (51). A fourth port of the second four-way switching valve (F2) communicates with a second port of each of first and second suction three-way valves (61) and (63).

The other configurations of the magnetic refrigeration apparatus (1) of this variation are basically the same as, or similar to, those of the magnetic refrigeration apparatus (1) of the second embodiment.

Operation of Magnetic Refrigeration Apparatus

The magnetic refrigeration apparatus (1) of the first variation of the second embodiment performs a cooling operation, a heating operation, and a defrosting operation. The heating operation includes first and second heating actions. The defrosting operation includes first and second defrosting actions.

Cooling Operation

The magnetic refrigeration unit (U) alternately repeats fifth and sixth actions as in the first variation of the first embodiment.

Figure 28:
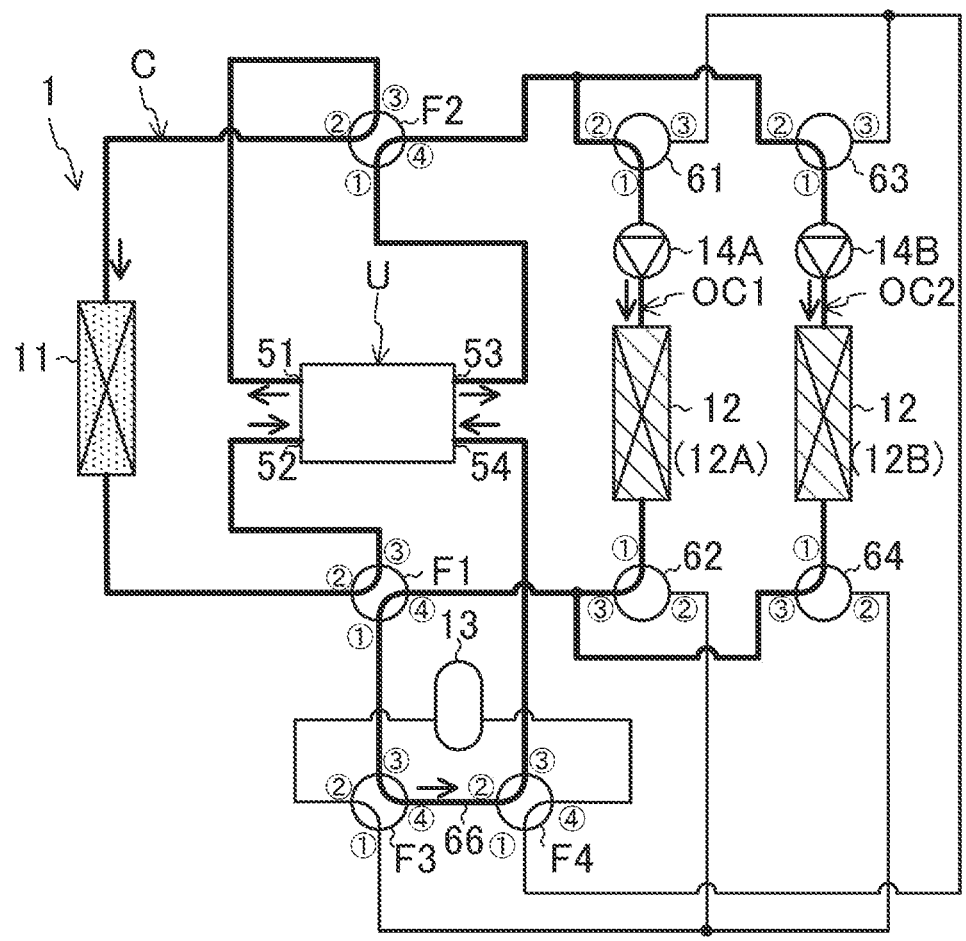
FIG. 28 is a piping system diagram of the magnetic refrigeration apparatus according to the first variation of the second embodiment, for illustrating a cooling operation.

In the cooling operation illustrated in FIG. 28, the first four-way switching valve (F1) is set to the second state; the second four-way switching valve (F2) is set to the second state; the third four-way switching valve (F3) is set to the first state; the fourth four-way switching valve (F4) is set to the second state; the first suction three-way valve (61) is set to the first state; the first discharge three-way valve (62) is set to the second state; the second suction three-way valve (63) is set to the first state; and the second discharge three-way valve (64) is set to the second state. The first pump (14A) and the second pump (14B) are paused. The first pump (14A) and the second pump (14B) may operate.

As in the second embodiment, in the cooling operation, a heating medium absorbs heat in the indoor heat exchanger (11). The heating medium dissipates heat in each of the first outdoor heat exchanger (12A) and the second outdoor heat exchanger (12B). The heating medium heated by the magnetic refrigeration unit (U) bypasses the tank (13), and then returns to the magnetic refrigeration unit (U).

Heating Operation

In this variation, the heating operation is performed as in the second embodiment.

First Heating Action

The magnetic refrigeration unit (U) alternately repeats fifth and sixth actions as in the first variation of the first embodiment.

Figure 29:
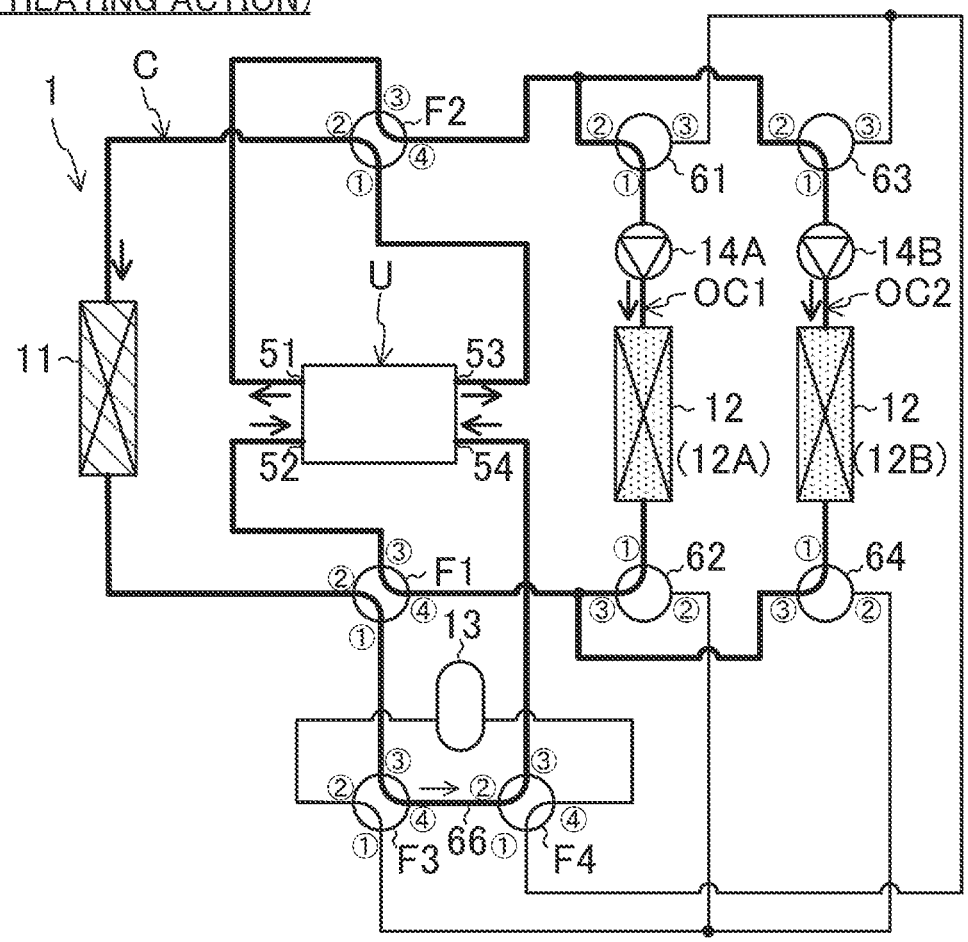
FIG. 29 is a piping system diagram of the magnetic refrigeration apparatus according to the first variation of the second embodiment, for illustrating a heating operation (a first heating action).

In the first heating action illustrated in FIG. 29, the first four-way switching valve (F1) is set to the first state; the second four-way switching valve (F2) is set to the first state; the third four-way switching valve (F3) is set to the first state; the fourth four-way switching valve (F4) is set to the second state; the first suction three-way valve (61) is set to the first state; the first discharge three-way valve (62) is set to the second state; the second suction three-way valve (63) is set to the first state; and the second discharge three-way valve (64) is set to the second state. The first pump (14A) and the second pump (14B) are paused. The first pump (14A) and the second pump (14B) may operate.

As in the second embodiment, in the first heating action, the heating medium dissipates heat in the indoor heat exchanger (11). The heating medium absorbs heat in each of the first outdoor heat exchanger (12A) and the second outdoor heat exchanger (12B). The heating medium heated by the magnetic refrigeration unit (U) bypasses the tank (13), and then returns to the magnetic refrigeration unit (U). It is therefore possible to shorten the start-up time of the heating operation as in the second embodiment.

Second Heating Action

The magnetic refrigeration unit (U) alternately repeats fifth and sixth actions as in the first variation of the first embodiment.

Figure 30:
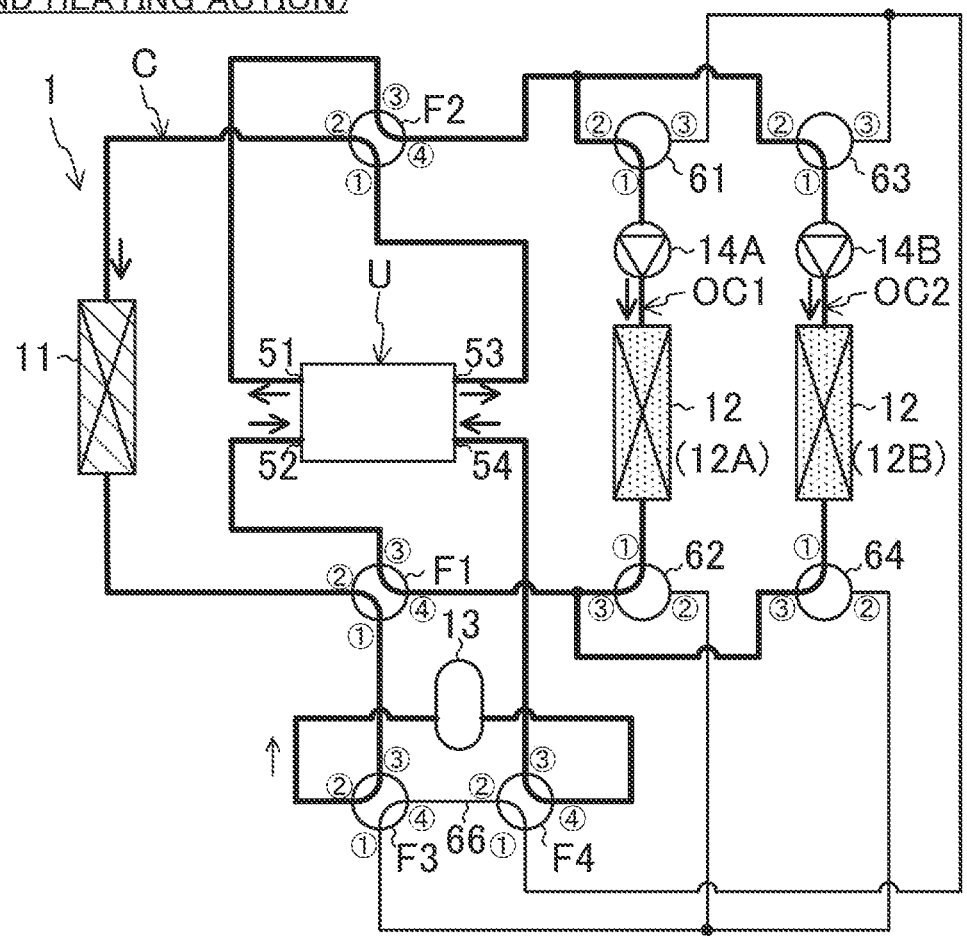
FIG. 30 is a piping system diagram of the magnetic refrigeration apparatus according to the first variation of the second embodiment, for illustrating the heating operation (a second heating action).

In the second heating action illustrated in FIG. 30, the first four-way switching valve (F1) is set to the first state; the second four-way switching valve (F2) is set to the first state; the third four-way switching valve (F3) is set to the second state; the fourth four-way switching valve (F4) is set to the first state; the first suction three-way valve (61) is set to the first state; the first discharge three-way valve (62) is set to the second state; the second suction three-way valve (63) is set to the first state; and the second discharge three-way valve (64) is set to the second state. The first pump (14A) and the second pump (14B) are paused. The first pump (14A) and the second pump (14B) may operate.

As in the second embodiment, in the second heating action, the heating medium dissipates heat in the indoor heat exchanger (11). The heating medium absorbs heat in each of the first outdoor heat exchanger (12A) and the second outdoor heat exchanger (12B). The heating medium heated by the magnetic refrigeration unit (U) passes through the tank (13), and then returns to the magnetic refrigeration unit (U).

Defrosting Operation

The defrosting operation includes first and second defrosting actions. The outdoor heat exchangers (12) that is a defrosting target and the outdoor heat exchanger (12) that allows the heating medium to absorb heat vary in these defrosting actions. In the defrosting operation of this example, the first defrosting action and the second defrosting action are each performed at least once.

Specifically, in the first defrosting action, the first outdoor heat exchanger (12A) is a defrosting target, and the heating medium absorbs heat in the second outdoor heat exchanger (12B). In the second defrosting action, the second outdoor heat exchanger (12B) is a defrosting target, and the heating medium absorbs heat in the first outdoor heat exchanger (12A). In each of these defrosting actions, the following actions are executed simultaneously: an action in which the heating medium heated by the magnetic refrigerator (20) dissipates heat in the indoor heat exchanger (11) and the heating medium cooled by the magnetic refrigerator (20) absorbs heat in one of the outdoor heat exchangers (12); and an action in which the heating medium in the tank (13) is supplied to the other outdoor heat exchanger (12) that is a defrosting target.

First Defrosting Action

The magnetic refrigeration unit (U) alternately repeats fifth and sixth actions as in the first variation of the first embodiment.

Figure 31:
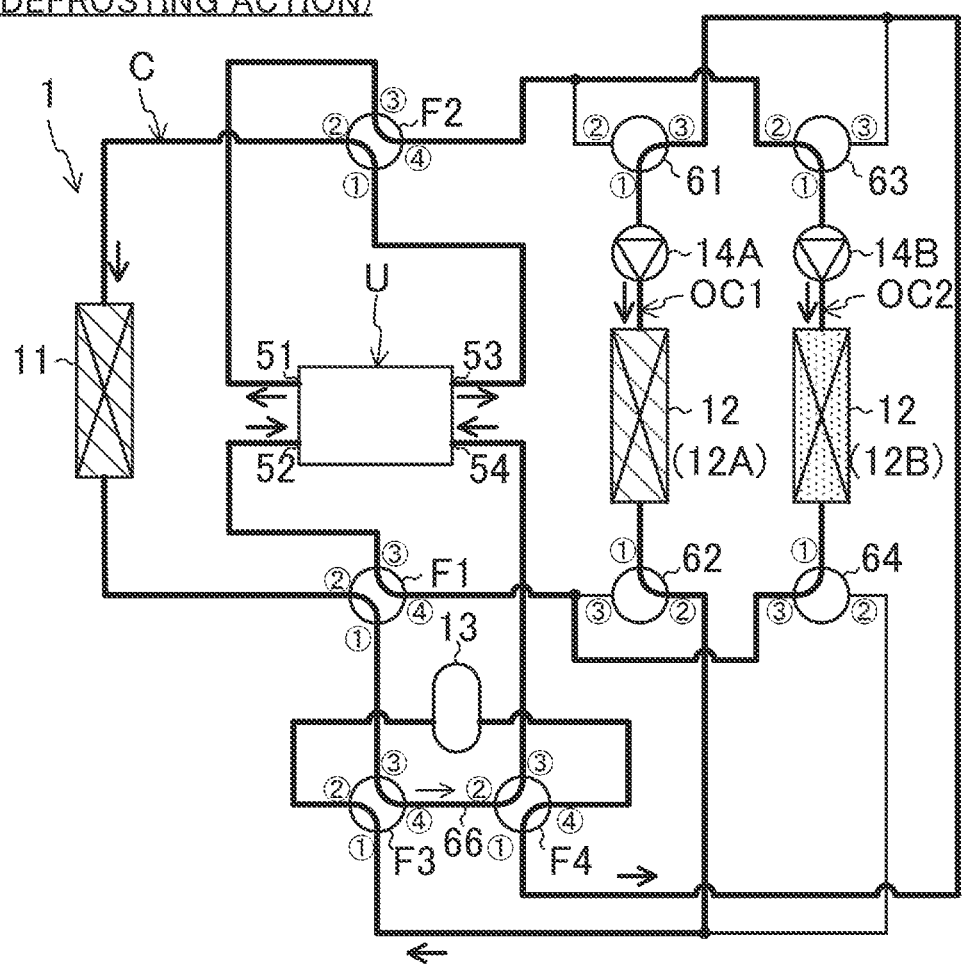
FIG. 31 is a piping system diagram of the magnetic refrigeration apparatus according to the first variation of the second embodiment, for illustrating a defrosting operation (a first defrosting action).

In the first defrosting action illustrated in FIG. 31, the first four-way switching valve (F1) is set to the first state; the second four-way switching valve (F2) is set to the first state; the third four-way switching valve (F3) is set to the first state; the fourth four-way switching valve (F4) is set to the second state; the first suction three-way valve (61) is set to the second state; the first discharge three-way valve (62) is set to the first state; the second suction three-way valve (63) is set to the first state; and the second discharge three-way valve (64) is set to the second state. The first pump (14A) operates. The second pump (14B) is paused. The second pump (14B) may operate.

In the first defrosting action, the heating medium absorbs heat in the second outdoor heat exchanger (12B), and dissipates heat in the indoor heat exchanger (11). At the same time, the heating medium in the tank (13) dissipates heat in the first outdoor heat exchanger (12A), and then returns to the tank (13).

Second Defrosting Action

The magnetic refrigeration unit (U) alternately repeats fifth and sixth actions as in the first variation of the first embodiment.

Figure 32:
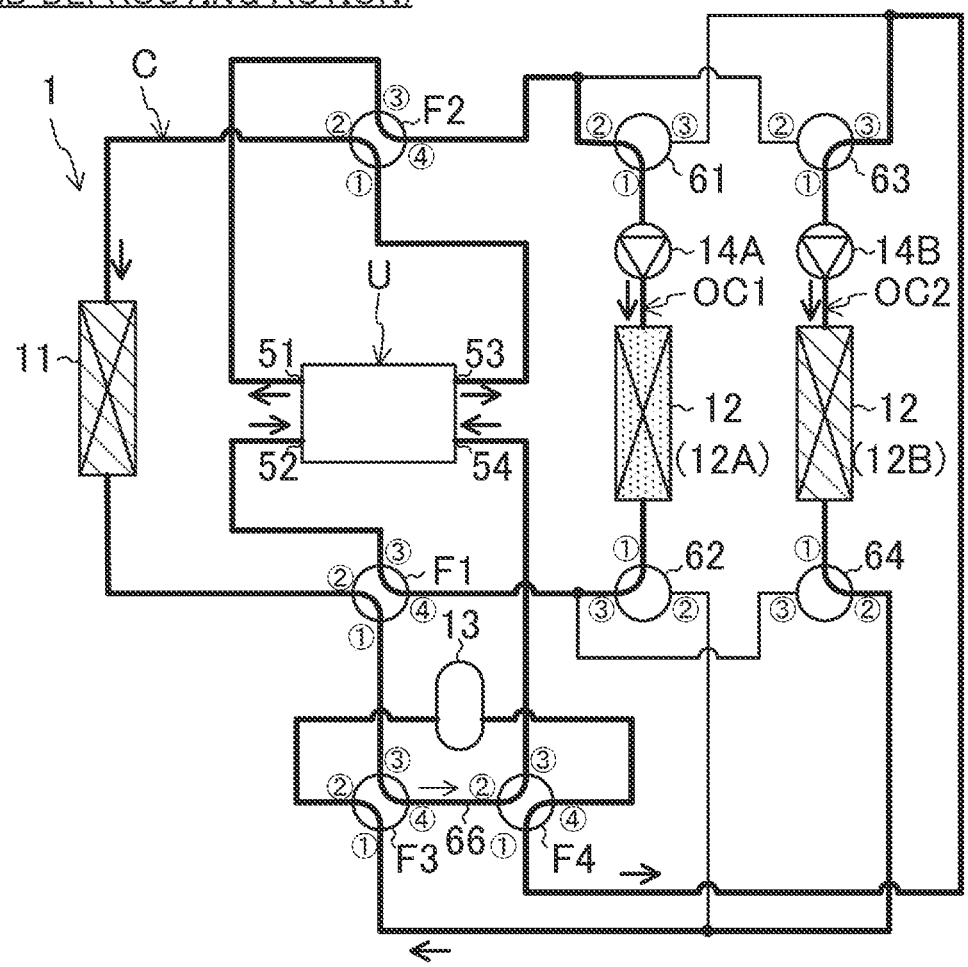
FIG. 32 is a piping system diagram of the magnetic refrigeration apparatus according to the first variation of the second embodiment, for illustrating the defrosting operation (a second defrosting action).

In the second defrosting action illustrated in FIG. 32, the first four-way switching valve (F1) is set to the first state; the second four-way switching valve (F2) is set to the first state; the third four-way switching valve (F3) is set to the first state; the fourth four-way switching valve (F4) is set to the second state; the first suction three-way valve (61) is set to the first state; the first discharge three-way valve (62) is set to the second state; the second suction three-way valve (63) is set to the second state; and the second discharge three-way valve (64) is set to the first state. The second pump (14B) operates. The first pump (14A) is paused. The first pump (14A) may operate.

In the second defrosting action, the heating medium absorbs heat in the first outdoor heat exchanger (12A), and dissipates heat in the indoor heat exchanger (11). At the same time, the heating medium in the tank (13) dissipates heat in the second outdoor heat exchanger (12B), and then returns to the tank (13).

Other Features of Second Embodiment

The second embodiment and the first variation thereof may be modified as follows.

The tank (13) may be upstream of the indoor heat exchanger (11) in the heating operation.

The heating medium circuit (C) may include N (N≥3) or more outdoor heat exchangers (12). In this case, the number of outdoor heat exchangers that are defrosting targets is N (N≥3). In the defrosting operation, a plurality of defrosting actions are performed such that the outdoor heat exchangers (12) that are defrosting targets are varied in the respective defrosting actions. In a certain defrosting action, two or more outdoor heat exchangers (12) may be defrosting targets. For example, in a case in which the number of the outdoor heat exchangers (12) is three, two of these outdoor heat exchangers (12) may be defrosted, and the heating medium may absorb heat in the remaining one outdoor heat exchanger (12), in a certain defrosting action.

Third Embodiment

In a heating medium circuit (C) of a magnetic refrigeration apparatus (1) of a third embodiment, a tank (13) and an indoor heat exchanger (11) are connected together in parallel. The other features of this embodiment are the same as, or similar to, those of the first embodiment. The magnetic refrigeration unit (U) includes a single-level magnetic refrigerator (20).

Figure 33:
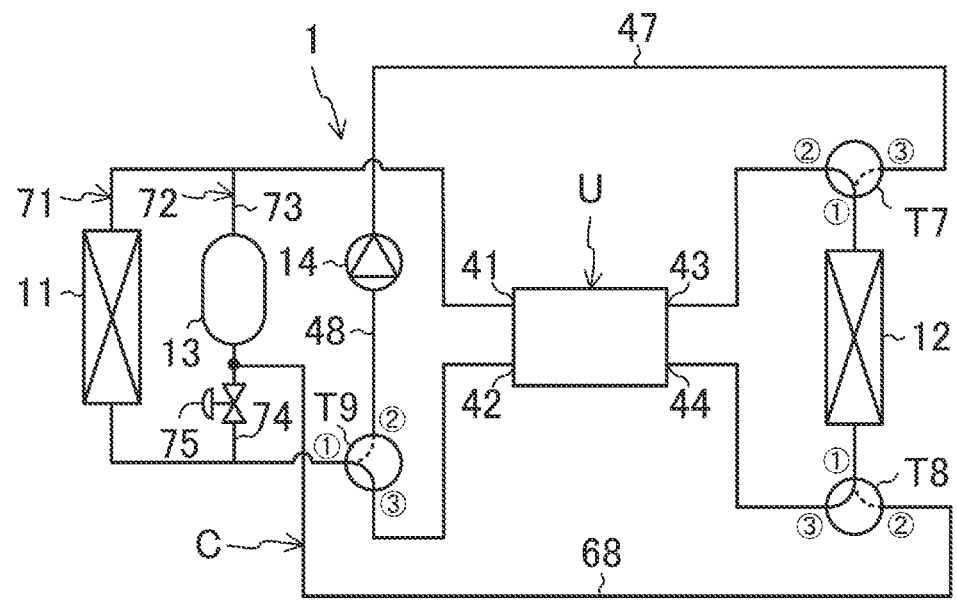
FIG. 33 is a piping system diagram of a magnetic refrigeration apparatus according to a third embodiment.

As illustrated in FIG. 33, the heating medium circuit (C) has a first channel (71) and a second channel (72). The first channel (71) and the second channel (72) are arranged in parallel with each other. The first channel (71) is provided with the indoor heat exchanger (11). The second channel (72) is provided with the tank (13). The first channel (71) corresponds to a bypass channel that bypasses the tank (13).

One end of each of the first and second channels (71) and (72) communicates with a first outflow pipe (41). The other end of each of the first and second channels (71) and (72) communicates with a first port of a ninth three-way valve (T9).

The second channel (72) includes a first pipe (73) and a second pipe (74). One end of the first pipe (73) is connected to the upper end of the tank (13). One end of the second pipe (74) is connected to the lower end of the tank (13).

A switching mechanism (15) includes a seventh three-way valve (T7), an eighth three-way valve (T8), the ninth three-way valve (T9), and a control valve (75).

A first port of the seventh three-way valve (T7) communicates with an outdoor heat exchanger (12). A second port of the seventh three-way valve (T7) communicates with a second outflow pipe (43). A third port of the seventh three-way valve (T7) communicates with a discharge pipe (47).

A first port of the eighth three-way valve (T8) communicates with the outdoor heat exchanger (12). A second port of the eighth three-way valve (T8) communicates with a third relay pipe (68). A third port of the eighth three-way valve (T8) communicates with a second inflow pipe (44).

A second port of the ninth three-way valve (T9) communicates with a suction pipe (48). A third port of the ninth three-way valve (T9) communicates with a first inflow pipe (42).

The control valve (75) is provided in the second pipe (74). The control valve (75) is configured as, for example, an on-off valve. The control valve (75) may be a flow rate control valve whose opening degree is adjustable in multiple stages. One end of the third relay pipe (68) is connected to a portion of the second pipe (74) between the control valve (75) and the tank (13).

Operation of Magnetic Refrigeration Apparatus

The magnetic refrigeration apparatus (1) performs a cooling operation, a heating operation, and a defrosting operation. The heating operation includes first and second heating actions.

Cooling Operation

The magnetic refrigeration unit (U) alternately repeats a first action (FIG. 4A) and a second action (FIG. 4B) as in the first embodiment.

Figure 34:
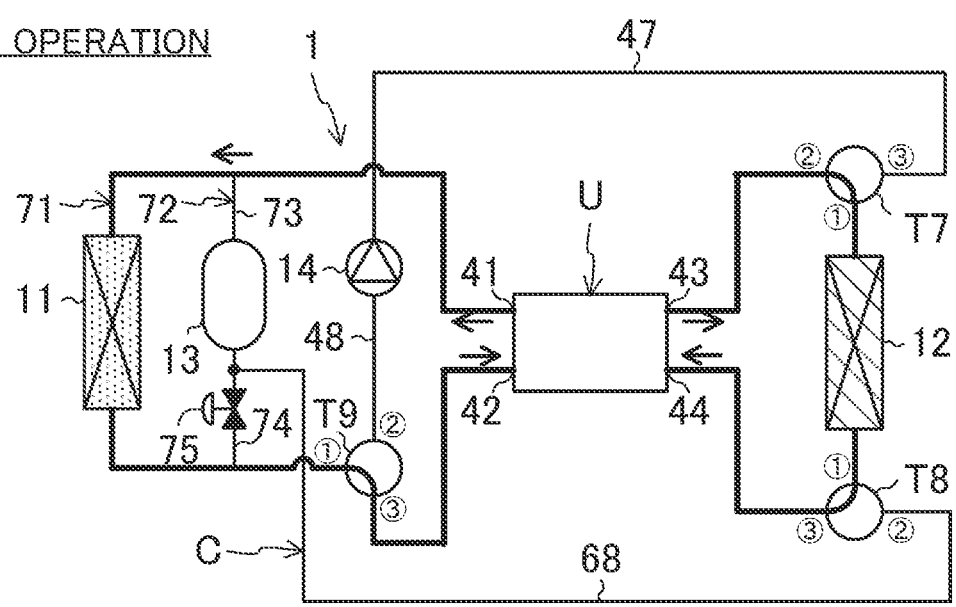
FIG. 34 is a piping system diagram of the magnetic refrigeration apparatus according to the third embodiment, for illustrating a cooling operation.

In the cooling operation illustrated in FIG. 34, the seventh three-way valve (T7) is set to the first state; the eighth three-way valve (T8) is set to the second state; and the ninth three-way valve (T9) is set to the second state. The control valve (75) is closed. A pump (14) is paused. In the drawings, the control valve (75) in the closed state is black-filled.

A heating medium heated by the magnetic refrigeration unit (U) passes through the seventh three-way valve (T7), and then dissipates heat in the outdoor heat exchanger (12). The heating medium that has dissipated heat in the outdoor heat exchanger (12) passes through the eighth three-way valve (T8), and then returns to the magnetic refrigeration unit (U).

The heating medium cooled by the magnetic refrigeration unit (U) flows into the first channel (71), and then flows through the indoor heat exchanger (11). The heating medium absorbs heat from indoor air in the indoor heat exchanger (11). As a result, the indoor air is cooled. The heating medium that has absorbed heat in the indoor heat exchanger (11) passes through the ninth three-way valve (T9), and then returns to the magnetic refrigeration unit (U). As can be seen, the heating medium cooled by the magnetic refrigeration unit (U) flows through the first channel (71), and thus substantially bypasses the tank (13).

Heating Operation

The heating operation includes first and second heating actions. The first heating action is executed at the start-up of the heating operation in the same manner as in the second embodiment. The first heating action is executed during a period from after receipt of a command in a controller (100) to execute the heating operation until satisfaction of the condition under which the heating operation becomes steady is satisfied. This condition is, for example, that the suction temperature of the indoor heat exchanger (11) reaches a predetermined temperature. The second heating action is executed when this condition is satisfied.

First Heating Action

The magnetic refrigeration unit (U) alternately repeats a third action (FIG. 5A) and a fourth action (FIG. 5B) as in the first embodiment.

Figure 35:
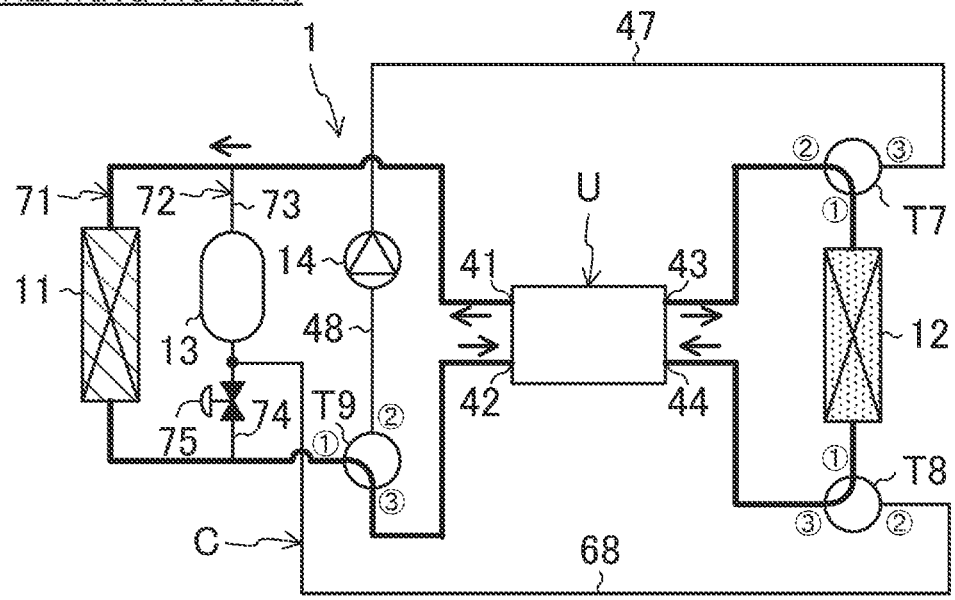
FIG. 35 is a piping system diagram of the magnetic refrigeration apparatus according to the third embodiment, for illustrating a heating operation (a first heating action).

In the first heating action illustrated in FIG. 35, the seventh three-way valve (T7) is set to the first state; the eighth three-way valve (T8) is set to the second state; and the ninth three-way valve (T9) is set to the second state. The control valve (75) is closed. The pump (14) is paused.

The heating medium cooled by the magnetic refrigeration unit (U) passes through the seventh three-way valve (T7), and then absorbs heat in the outdoor heat exchanger (12). The heating medium that has absorbed heat in the outdoor heat exchanger (12) passes through the eighth three-way valve (T8), and then returns to the magnetic refrigeration unit (U).

The heating medium heated by the magnetic refrigeration unit (U) flows into the first channel (71), and then flows through the indoor heat exchanger (11). The heating medium dissipates heat to indoor air in the indoor heat exchanger (11). As a result, the indoor air is heated. The heating medium that has dissipated heat in the indoor heat exchanger (11) passes through the ninth three-way valve (T9), and then returns to the magnetic refrigeration unit (U). As can be seen, the heating medium heated by the magnetic refrigeration unit (U) flows through the first channel (71), and thus substantially bypasses the tank (13).

Second Heating Action

The magnetic refrigeration unit (U) alternately repeats the third action (FIG. 5A) and the fourth action (FIG. 5B) as in the first embodiment.

Figure 36:
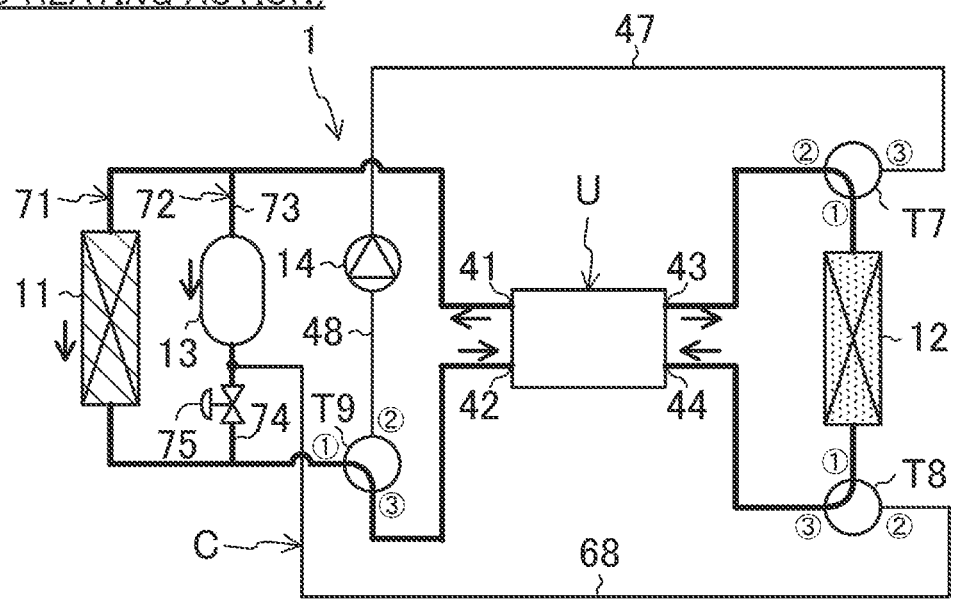
FIG. 36 is a piping system diagram of the magnetic refrigeration apparatus according to the third embodiment, for illustrating the heating operation (a second heating action).

In the second heating action illustrated in FIG. 36, the seventh three-way valve (17) is set to the first state; the eighth three-way valve (T8) is set to the second state; and the ninth three-way valve (T9) is set to the second state. The control valve (75) is opened. The pump (14) is paused.

The heating medium cooled by the magnetic refrigeration unit (U) passes through the seventh three-way valve (T7), and then absorbs heat in the outdoor heat exchanger (12). The heating medium that has absorbed heat in the outdoor heat exchanger (12) passes through the eighth three-way valve (T8), and then returns to the magnetic refrigeration unit (U).

The heating medium heated by the magnetic refrigeration unit (U) flows into the first channel (71) and the second channel (72). The heating medium in the first channel (71) flows through the indoor heat exchanger (11). The heating medium dissipates heat to indoor air in the indoor heat exchanger (11). As a result, the indoor air is heated. The heating medium that has dissipated heat in the indoor heat exchanger (11) flows out of the first channel (71).

The heating medium in the second channel (72) flows through the first pipe (73) into an upper portion of the tank (13). Thus, the heating medium with a high temperature is likely to accumulate in the upper portion of the tank (13). The heating medium at the bottom of the tank (13) flows out of the tank (13) through the second pipe (74). The heating medium passes through the control valve (75), and then flows out of the second channel (72).

The heating medium that has flowed out of each of the first and second channels (71) and (72) passes through the ninth three-way valve (T9), and then returns to the magnetic refrigeration unit (U).

As can be seen, the heating medium heated by the magnetic refrigeration unit (U) flows through the indoor heat exchanger (11) and the tank (13) in parallel. It is thus possible to heat indoor air in the indoor heat exchanger (11) and store heat in the tank (13) simultaneously.

Defrosting Operation

In the defrosting operation of the third embodiment, heat dissipation of the refrigerant in the indoor heat exchanger (11) and defrosting of the outdoor heat exchanger (12) are achieved at the same time.

Figure 37:
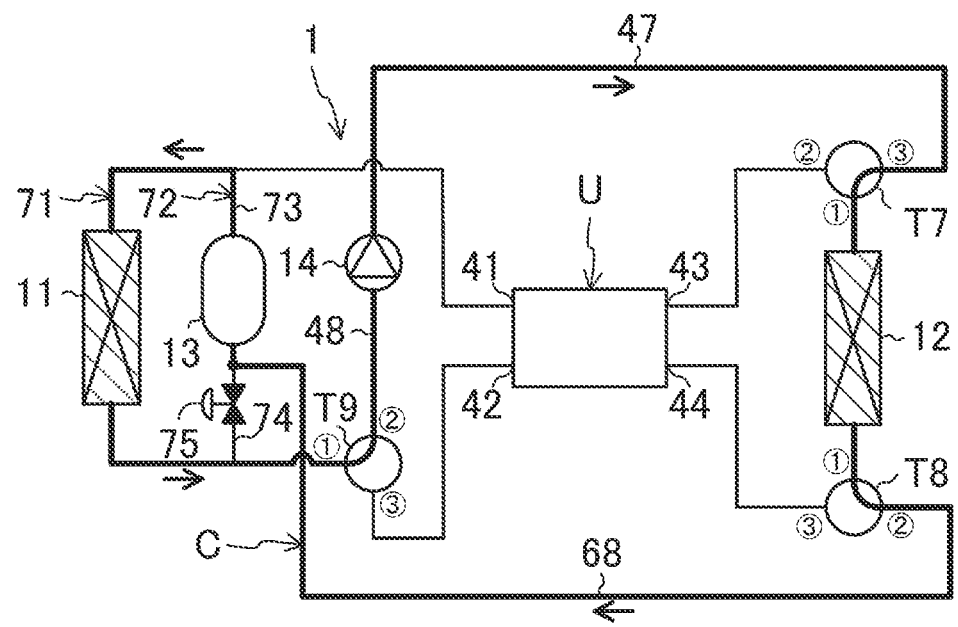
FIG. 37 is a piping system diagram of the magnetic refrigeration apparatus according to the third embodiment, for illustrating a defrosting operation.

In the defrosting operation illustrated in FIG. 37, the magnetic refrigeration unit (U) is paused. In the defrosting operation, the seventh three-way valve (T7) is set to the second state; the eighth three-way valve (T8) is set to the first state; and the ninth three-way valve (T9) is set to the first state. The control valve (75) is closed. The pump (14) operates.

When the pump (14) operates, the heating medium in the tank (13) flows out of the first pipe (73) to the outside. The heating medium with a high temperature is likely to accumulate in the upper portion of the tank (13). Thus, the heating medium with a relatively high temperature flows out of the tank (13).

The heating medium in the second channel (72) flows into the first channel (71), and then dissipates heat in the indoor heat exchanger (11). As a result, the indoor air is heated. The heating medium that has dissipated heat in the indoor heat exchanger (11) flows out of the first channel (71). This heating medium sequentially passes through the ninth three-way valve (T9), the suction pipe (48), the discharge pipe (47), and the seventh three-way valve (17), and then flows through the outdoor heat exchanger (12). The heating medium flowing through the outdoor heat exchanger (12) melts the frost on the surface of the outdoor heat exchanger (12). The heating medium that has been used to defrost the outdoor heat exchanger (12) sequentially passes through the eighth three-way valve (T8) and the third relay pipe (68), and then returns to the tank (13).

As can be seen, in the defrosting operation, heat stored in the tank (13) in the heating operation is used to heat indoor air in the indoor heat exchanger (11) and to defrost the outdoor heat exchanger (12).

First Variation of Third Embodiment

Figure 38:
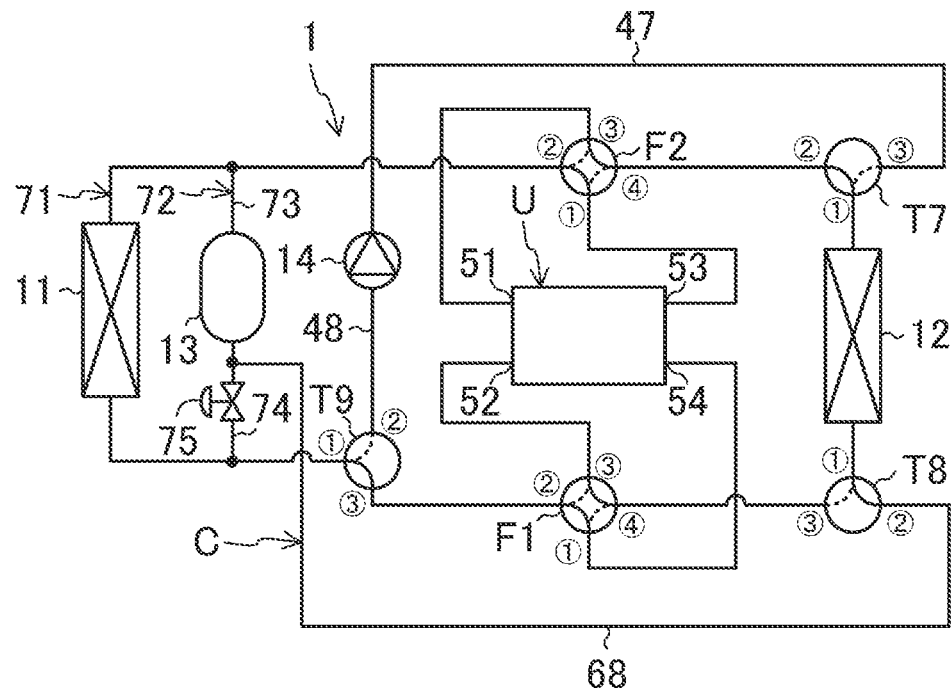
FIG. 38 is a piping system diagram of a magnetic refrigeration apparatus according to a first variation of the third embodiment.

A magnetic refrigeration apparatus (1) according to a first variation of the third embodiment, illustrated in FIG. 38, includes so-called cascaded magnetic refrigerators (20). The configuration of a magnetic refrigeration unit (U) of the first variation of the third embodiment is the same as, or similar to, that of the magnetic refrigeration unit (U) of the first variation of the first embodiment.

As in the first embodiment, a switching mechanism (15) of this variation includes a first four-way switching valve (F1) and a second four-way switching valve (F2).

A first port of the first four-way switching valve (F1) communicates with a high-temperature inflow pipe (54). A second port of the first four-way switching valve (F1) communicates with a third port of a ninth three-way valve (T9). A third port of the first four-way switching valve (F1) communicates with a low-temperature inflow pipe (52). A fourth port of the first four-way switching valve (F1) communicates with a third port of an eighth three-way valve (T8).

A first port of the second four-way switching valve (F2) communicates with a high-temperature outflow pipe (53). A second port of the second four-way switching valve (F2) communicates with the first channel (71) and the second channel (72). A third port of the second four-way switching valve (F2) communicates with a low-temperature outflow pipe (51). A fourth port of the second four-way switching valve (F2) communicates with a second port of a seventh three-way valve (T7).

The other configurations of the magnetic refrigeration apparatus (1) of this variation are basically the same as, or similar to, those of the magnetic refrigeration apparatus (1) of the third embodiment.

Operation of Magnetic Refrigeration Apparatus

The magnetic refrigeration apparatus (1) of the first variation of the third embodiment performs a cooling operation, a heating operation, and a defrosting operation. The heating operation includes first and second heating actions.

Cooling Operation

The magnetic refrigeration unit (U) alternately repeats fifth and sixth actions as in the first variation of the first embodiment.

Figure 39:
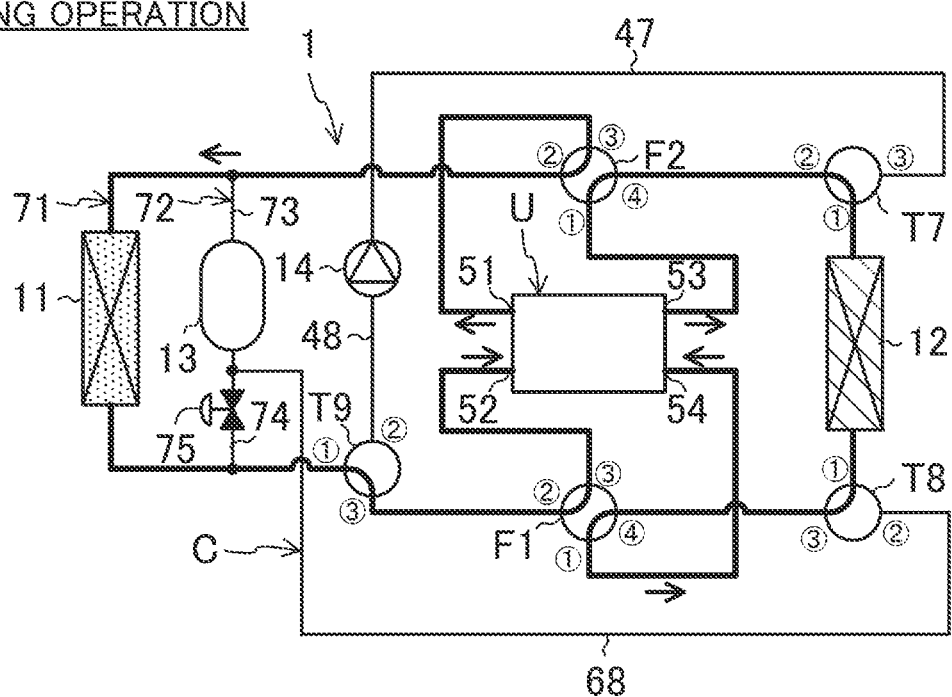
FIG. 39 is a piping system diagram of the magnetic refrigeration apparatus according to the first variation of the third embodiment, for illustrating a cooling operation.

In the cooling operation illustrated in FIG. 39, the first four-way switching valve (F1) is set to the second state; the second four-way switching valve (F2) is set to the second state; the seventh three-way valve (T7) is set to the first state; the eighth three-way valve (T8) is set to the second state; and the ninth three-way valve (T9) is set to the second state. The control valve (75) is closed. The pump (14) is paused.

As in the second embodiment, in the cooling operation, the heating medium dissipates heat in the outdoor heat exchanger (12). The heating medium absorbs heat in the indoor heat exchanger (11). The heating medium cooled by the magnetic refrigeration unit (U) bypasses the tank (13), and then returns to the magnetic refrigeration unit (U).

Heating Operation

In this variation, the heating operation is performed as in the third embodiment.

First Heating Action

Figure 40:
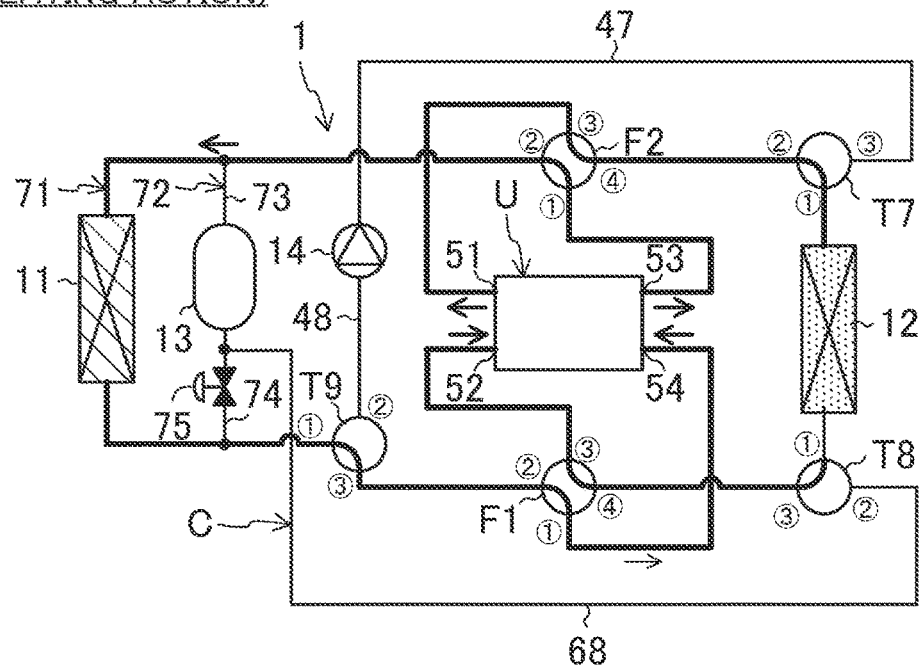
FIG. 40 is a piping system diagram of the magnetic refrigeration apparatus according to the first variation of the third embodiment, for illustrating a heating operation (a first heating action).

In the first heating action illustrated in FIG. 40, the first four-way switching valve (F1) is set to the first state; the second four-way switching valve (F2) is set to the first state; the seventh three-way valve (T7) is set to the first state; the eighth three-way valve (T8) is set to the second state; and the ninth three-way valve (T9) is set to the second state. The control valve (75) is closed. The pump (14) is paused.

As in the third embodiment, in the first heating action, the heating medium absorbs heat in the outdoor heat exchanger (12). The heating medium dissipates heat in the indoor heat exchanger (11). The heating medium heated by the magnetic refrigeration unit (U) bypasses the tank (13), and then returns to the magnetic refrigeration unit (U). It is therefore possible to shorten the start-up time of the heating operation as in the third embodiment.

Second Heating Action

Figure 41:
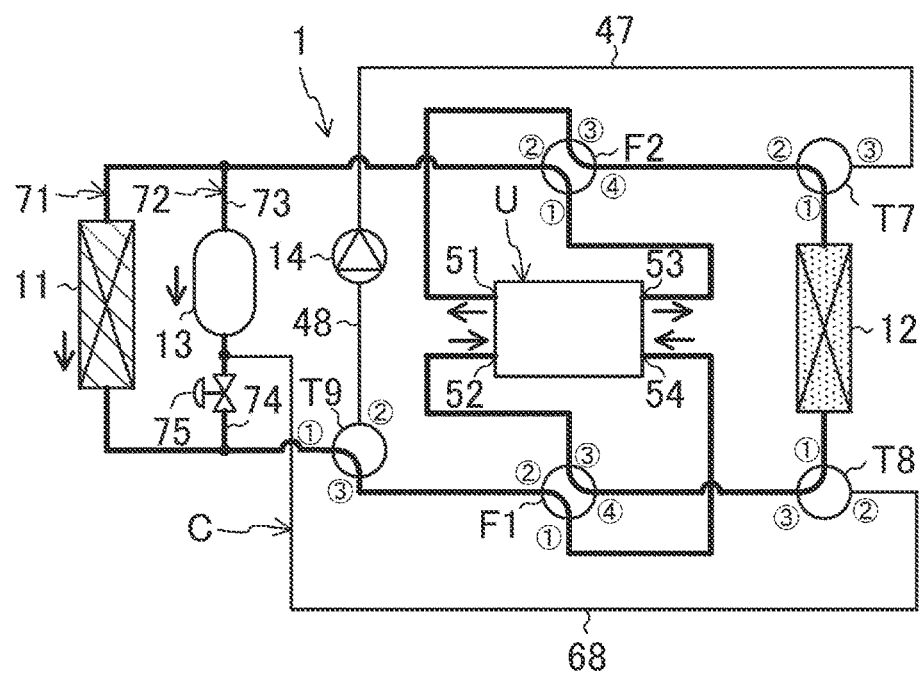
FIG. 41 is a piping system diagram of the magnetic refrigeration apparatus according to the first variation of the third embodiment, for illustrating the heating operation (a second heating action).

In the second heating action illustrated in FIG. 41, the first four-way switching valve (F1) is set to the first state; the second four-way switching valve (F2) is set to the first state; the seventh three-way valve (T7) is set to the first state; the eighth three-way valve (T8) is set to the second state; and the ninth three-way valve (T9) is set to the second state. The control valve (75) is opened. The pump (14) is paused.

As in the third embodiment, in the second heating action, the heating medium absorbs heat in the outdoor heat exchanger (12). The heating medium heated by the magnetic refrigeration unit (U) flows through the indoor heat exchanger (11) and the tank (13) in parallel. The heating medium flows into the tank (13) from an upper end of the tank (13). Heat of the heating medium is stored in the tank (13).

Defrosting Operation

Figure 42:
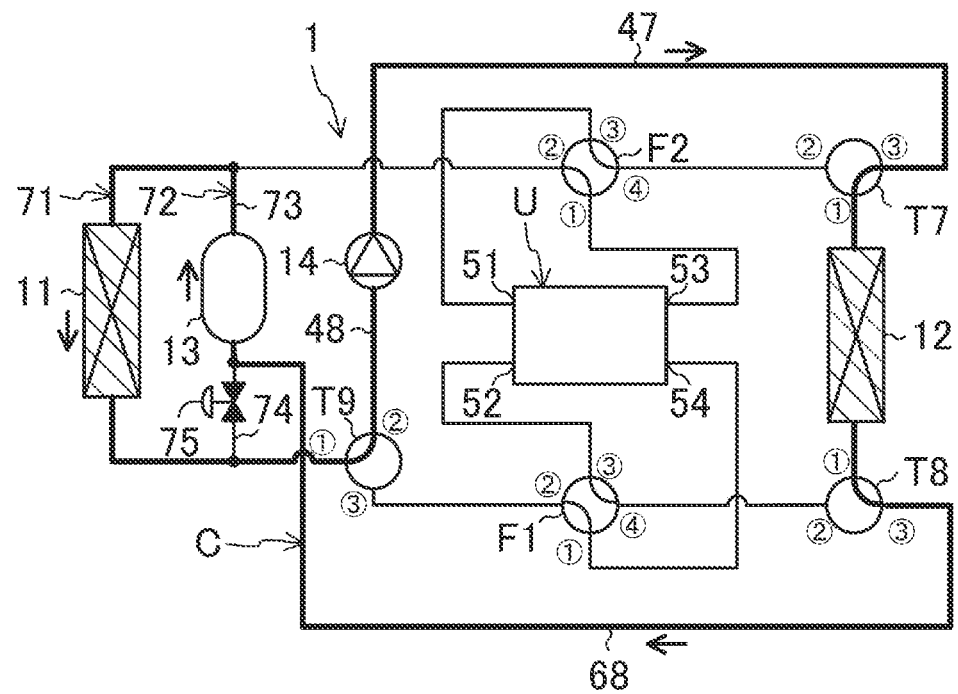
FIG. 42 is a piping system diagram of the magnetic refrigeration apparatus according to the first variation of the third embodiment, for illustrating a defrosting operation.

In the defrosting operation illustrated in FIG. 42, the seventh three-way valve (T7) is set to the second state; the eighth three-way valve (T8) is set to the second state; and the ninth three-way valve (T9) is set to the first state. The control valve (75) is closed. The pump (14) operates.

As in the third embodiment, in the defrosting operation, the heating medium in the tank (13) dissipates heat in the indoor heat exchanger (11). The heating medium that has dissipated heat in the indoor heat exchanger (11) further dissipates heat in the outdoor heat exchanger (12).

Other Features of Third Embodiment

The third embodiment and the first variation thereof may be modified as follows.

The tank (13) may be upstream of the indoor heat exchanger (11) in the heating operation.

in the second heating action, the heating medium may flow into the tank (13) through a low portion of the tank (13).

OTHER EMBODIMENTS

The embodiments and variations described above may be implemented as follows.

Figure 43:
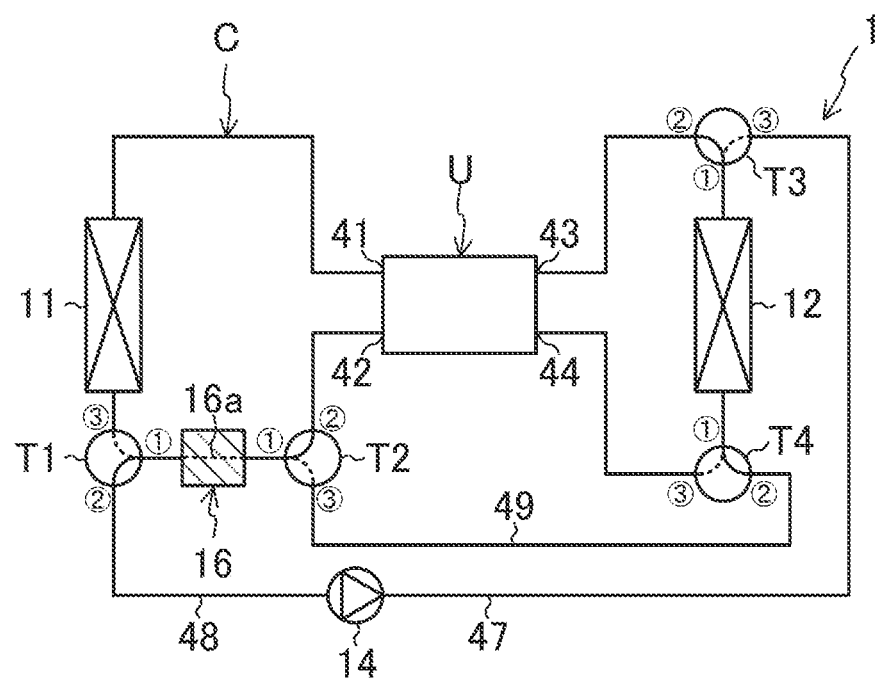
FIG. 43 is a piping system diagram of a magnetic refrigeration apparatus according to another first example.

As illustrated in FIG. 43, the thermal storage section may be configured as a thermal storage material (16). The thermal storage material (16) is a metal material with a high heat capacity or a phase change material, for example. The thermal storage material (16) has a channel (16a) formed therein, through which the heating medium flows. In the heating operation, the heating medium heated by the magnetic refrigeration unit (U) flows through the channel (16a) of the thermal storage material (16). As a result, heat of the heating medium is stored in the thermal storage material (16). In the defrosting operation, the heat stored in the thermal storage material (16) is used to defrost the outdoor heat exchanger (12).

Figure 44:
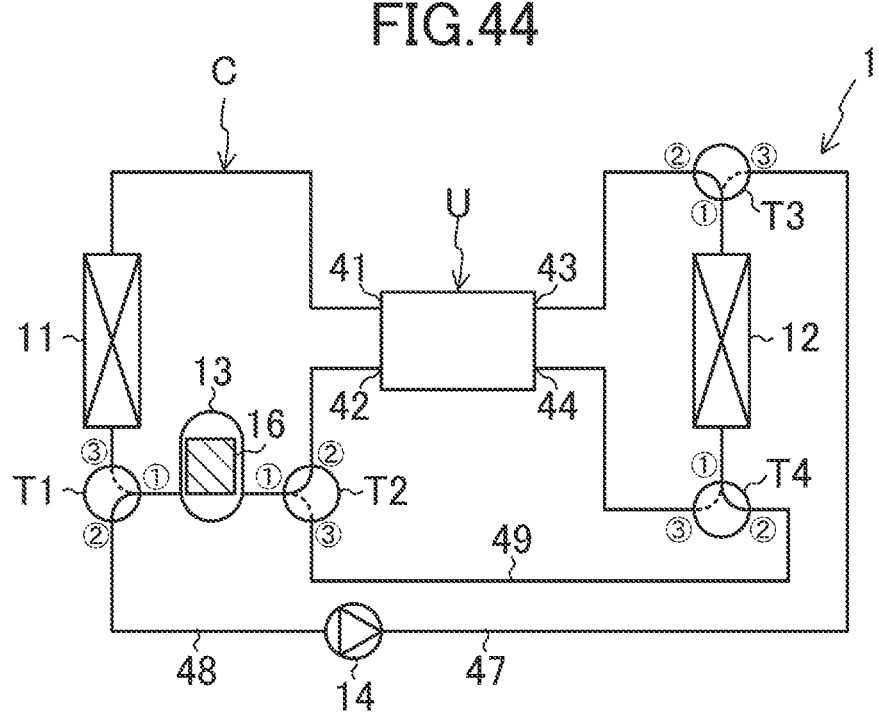
FIG. 44 is a piping system diagram of a magnetic refrigeration apparatus according to still another second example.

As illustrated in FIG. 44, the thermal storage material (16) may be provided inside the tank (13) in which the heating medium is stored. This configuration increases the substantial thermal storage capacity of the tank (13).

The heat accumulated in the thermal storage section may be transferred to the second heat exchanger (12) through a metal material with a high thermal conductivity or any other suitable material. Thus, the second heat exchanger (12) can be defrosted.

The magnetic field modulator (23) may be of one of the following types 1) to 4), or may be of any other type.

1) Linear drive magnetic field modulator including a permanent magnet

2) Rotary drive magnetic field modulator including a permanent magnet

3) Static magnetic field modulator including an electromagnet

4) Static magnetic field modulator including an electromagnet and a permanent magnet The thermal storage section may be configured to be capable of storing heat from a device. If the magnetic field modulator (23) includes an electromagnet, the thermal storage section may be configured to collect heat from a coil.

The thermal storage section may be configured to collect heat from an electronic component.

The magnetic refrigeration apparatus (1) (solid-state refrigeration apparatus) may include two or more indoor heat exchangers (11) or two or more outdoor heat exchangers (12).

The magnetic refrigeration apparatus (1) (solid-state refrigeration apparatus) may cool air inside a refrigerator or a freezer. According to this configuration, the first heat exchanger (11) serves as a heat source heat exchanger, and the second heat exchanger (12) serves as a utilization heat exchanger. The utilization heat exchanger cools the inside air. In this case, an operation in which the heating medium dissipates heat in the heat source heat exchanger, and absorbs heat in the utilization heat exchanger corresponds to a heat application operation. An operation in which the heat stored in the heat application operation is used to defrost the utilization heat exchanger corresponds to a defrosting operation.

The magnetic refrigeration apparatus (1) (solid-state refrigeration apparatus) may be a heat pump chiller or a hot water supply apparatus. According to this configuration, the first heat exchanger (11) transfers heat between a heating medium in the heating medium circuit (C) and a different heating medium flowing through a secondary channel. The different heating medium includes fluids, such as water or a refrigerant. The second heat exchanger (12) may transfer heat between the heating medium in the heating medium circuit (C) and the different heating medium flowing through the secondary channel.

The decline in the heating capacity may be reduced by increasing the output of the magnetic refrigeration unit (U) at least at the staff of the heating operation. Specifically, the output of the magnetic refrigeration unit (U) until satisfaction of the condition for the start-up of the heating operation is made higher than the output of the magnetic refrigeration unit (U) after the satisfaction of that condition. The output of the magnetic refrigeration unit (U) can be controlled based on, for example, the frequency at which the magnetic refrigeration unit (U) causes the heating medium to move bidirectionally. Thus, the decline in the heating capacity at the start-up of the heating operation can be reduced.

The solid-state refrigeration apparatus may be of any type other than a magnetic refrigeration apparatus that causes the magnetic working substance (22) to produce a magnetocaloric effect. The solid refrigerant substance (22) as used herein includes a substance with properties between liquid and solid, such as a plastic crystal.

Other types of the solid-state refrigeration apparatus include: (1) a type that causes the solid refrigerant substance to produce an electrocaloric effect; (2) a type that causes the solid refrigerant substance to produce a barocaloric effect; and (3) a type that causes the solid refrigerant substance to produce an elastocaloric effect.

An induction section of the solid-state refrigeration apparatus of the type (1) applies an electric field variation to the solid refrigerant substance. As a result, the solid refrigerant substance undergoes a phase transition from a ferroelectric substance to a paraelectric substance, for example, and thus generates or absorbs heat.

An induction section of the solid-state refrigeration apparatus of the type (2) applies a pressure variation to the solid refrigerant substance. As a result, the solid refrigerant substance undergoes a phase transition, and thus generates or absorbs heat.

An induction section of the solid-state refrigeration apparatus of the type (3) applies a stress variation to the solid refrigerant substance. As a result, the solid refrigerant substance undergoes a phase transition, and thus generates or absorbs heat.

While the embodiments and the variations thereof have been described above, it will be understood that various changes in form and details may be made without departing from the spirit and scope of the claims. The embodiments and the variations thereof may be combined and replaced with each other without deteriorating intended functions of the present disclosure.

The ordinal numbers such as "first," "second," "third," . . . described above are used to distinguish the terms to which these expressions are given, and do not limit the number and order of the terms.

As can be seen from the foregoing description, the present disclosure is useful for a solid-state refrigeration apparatus, in particular, a magnetic refrigeration apparatus.

The invention claimed is:

1. A solid-state refrigeration apparatus comprising:
a solid cooling portion including a solid refrigerant substance, an internal channel where the solid refrigerant substance is disposed, and an induction section configured to cause the solid refrigerant substance to produce a caloric effect;
at least one first heat exchanger;
at least one second heat exchanger;
a heating medium circuit connected to the first heat exchanger, the second heat exchanger, and the internal channel;
a reciprocating conveying mechanism configured to reciprocally convey a heating medium in the heating medium circuit; and
a thermal storage section,
the solid-state refrigeration apparatus being configured to perform
a heat application operation in which the heating medium heated by the solid cooling portion dissipates heat in the first heat exchanger and the heating medium cooled by the solid cooling portion absorbs heat in the second heat exchanger, and
a defrosting operation in which frost on the second heat exchanger is melted,
the thermal storage section being configured to store heat in the heat application operation,
in the defrosting operation, the frost on the second heat exchanger being melted using the heat stored in the thermal storage section, and
in the defrosting operation, the heating medium in the thermal storage section flowing through the second heat exchanger and returning to the thermal storage section without passing through the solid cooling portion.

2. The solid-state refrigeration apparatus of claim 1, further comprising:
a conveying section,
the thermal storage section including a tank configured to store the heating medium heated by the solid cooling portion in the heat application operation, and
the conveying section being configured to convey the heating medium in the tank to the second heat exchanger in the defrosting operation.

3. The solid-state refrigeration apparatus of claim 2, further comprising:
a switching mechanism configured to switch between channels of the heating medium circuit so that the heating medium heated by the solid cooling portion flows through the first heat exchanger and the thermal storage section in the heat application operation and the heating medium in the thermal storage section flows through the second heat exchanger in the defrosting operation.

4. The solid-state refrigeration apparatus of claim 3, wherein
the at least one second heat exchanger includes a plurality of second heat exchangers,
the defrosting operation includes a plurality of defrosting actions by which the second heat exchangers that are defrosting targets and the second heat exchangers that allow the heating medium to absorb heat are varied, and
in each of the defrosting actions,
an action in which the heating medium heated by the solid cooling portion dissipates heat in the first heat exchanger and the heating medium cooled by the solid cooling portion absorbs heat in one or more of the second heat exchangers, and
an action in which the heating medium in the thermal storage section is supplied to another one or more of the second heat exchangers that is a defrosting target are simultaneously executed.

5. The solid-state refrigeration apparatus of claim 4, wherein
the solid refrigerant substance is a magnetic working substance,
the induction section is a magnetic field modulator configured to apply a magnetic field variation to the magnetic working substance, and
the solid cooling portion is a magnetic refrigerator.

6. The solid-state refrigeration apparatus of claim 3, wherein
the thermal storage section is disposed on a portion of the heating medium circuit downstream of the first heat exchanger in the heat application operation.

7. The solid-state refrigeration apparatus of claim 6, wherein
the solid refrigerant substance is a magnetic working substance,
the induction section is a magnetic field modulator configured to apply a magnetic field variation to the magnetic working substance, and
the solid cooling portion is a magnetic refrigerator.

8. The solid-state refrigeration apparatus of claim 3, wherein
the thermal storage section is disposed in parallel with the first heat exchanger in the heating medium circuit in the heat application operation.

9. The solid-state refrigeration apparatus of claim 8, wherein
the switching mechanism switches between the channels of the heating medium circuit so that
the heating medium heated by the solid cooling portion flows through the first heat exchanger and the thermal storage section in parallel in the heat application operation and
the heating medium in the thermal storage section flows through the first heat exchanger and the second heat exchanger in the defrosting operation.

10. The solid-state refrigeration apparatus of claim 8, wherein
the solid refrigerant substance is a magnetic working substance,
the induction section is a magnetic field modulator configured to apply a magnetic field variation to the magnetic working substance, and
the solid cooling portion is a magnetic refrigerator.

11. The solid-state refrigeration apparatus of claim 3, wherein
the heating medium circuit includes a bypass channel through which the heating medium heated by the solid cooling portion bypasses the thermal storage section at least at a start of the heat application operation.

12. The solid-state refrigeration apparatus claim 3, wherein
the solid refrigerant substance is a magnetic working substance,
the induction section is a magnetic field modulator configured to apply a magnetic field variation to the magnetic working substance,
the solid cooling portion is a single-level magnetic refrigerator including the magnetic working substance of one type,
the solid-state refrigeration apparatus is configured to further perform a refrigerating operation in which the heating medium cooled by the magnetic refrigerator absorbs heat in the first heat exchanger and the heating medium heated by the magnetic refrigerator dissipates heat in the second heat exchanger,
the heating medium circuit includes a first outflow section, a first inflow section, a second outflow section, and a second inflow section each communicating with the internal channel of the magnetic refrigerator, and
the switching mechanism forms
a channel in which
the heating medium heated by the magnetic refrigerator flows through the first outflow section, the first heat exchanger, the thermal storage section, and the first inflow section and
the heating medium cooled by the magnetic refrigerator flows through the second outflow section, the second heat exchanger, and the second inflow section in the heat application operation,
a channel in which
the heating medium cooled by the magnetic refrigerator flows through the first outflow section, the first heat exchanger, and the first inflow section and
the heating medium heated by the magnetic refrigerator flows through the second outflow section, the second heat exchanger, and the second inflow section in the refrigerating operation, and
a channel in which the heating medium in the thermal storage section flows through the second heat exchanger in the defrosting operation.

13. The solid-state refrigeration apparatus of claim 3, wherein
the solid refrigerant substance is a magnetic working substance,
the induction section is a magnetic field modulator configured to apply a magnetic field variation to the magnetic working substance,
the solid cooling portion is configured as a cascaded magnetic refrigerator including the magnetic working substance of a plurality of types,
the solid-state refrigeration apparatus is configured to further perform a refrigerating operation in which the heating medium cooled by the magnetic refrigerator absorbs heat in the first heat exchanger and the heating medium heated by the magnetic refrigerator dissipates heat in the second heat exchanger, the heating medium circuit includes a low-temperature outflow section, a low-temperature inflow section, a high-temperature outflow section, and a high-temperature inflow section each communicating with the internal channel of the magnetic refrigerator, and the switching mechanism forms a channel in which the heating medium heated by the magnetic refrigerator flows through the high-temperature outflow section, the first heat exchanger, the thermal storage section, and the high-temperature inflow section and the heating medium cooled by the magnetic refrigerator flows through the low-temperature outflow section, the second heat exchanger, and the low-temperature inflow section in the heat application operation, a channel in which the heating medium cooled by the magnetic refrigerator flows through the low-temperature outflow section, the first heat exchanger, and the low-temperature inflow section and the heating medium heated by the magnetic refrigerator flows through the high-temperature outflow section, the second heat exchanger, and the high-temperature inflow section in the refrigerating operation, and a channel in which the heating medium in the thermal storage section flows through the second heat exchanger in the defrosting operation.

14. The solid-state refrigeration apparatus of claim 3, wherein the solid refrigerant substance is a magnetic working substance, the induction section is a magnetic field modulator configured to apply a magnetic field variation to the magnetic working substance, and the solid cooling portion is a magnetic refrigerator.

15. The solid-state refrigeration apparatus of claim 2, wherein the solid refrigerant substance is a magnetic working substance, the induction section is a magnetic field modulator configured to apply a magnetic field variation to the magnetic working substance, and the solid cooling portion is a magnetic refrigerator.

16. The solid-state refrigeration apparatus of claim 1, wherein the thermal storage section includes a thermal storage material.

17. The solid-state refrigeration apparatus of claim 16, wherein the solid refrigerant substance is a magnetic working substance, the induction section is a magnetic field modulator configured to apply a magnetic field variation to the magnetic working substance, and the solid cooling portion is a magnetic refrigerator.

18. The solid-state refrigeration apparatus of claim 1, further comprising:

a conveying section, the thermal storage section including a thermal storage material arranged and configured to store heat of the heating medium heated by the solid cooling portion in the heat application operation, and the conveying section being configured to convey heat of the thermal storage material to the second heat exchanger through the heating medium in the defrosting operation.

19. The solid-state refrigeration apparatus of claim 18, wherein the solid refrigerant substance is a magnetic working substance, the induction section is a magnetic field modulator configured to apply a magnetic field variation to the magnetic working substance, and the solid cooling portion is a magnetic refrigerator.

20. The solid-state refrigeration apparatus of claim 1, wherein the solid refrigerant substance is a magnetic working substance, the induction section is a magnetic field modulator configured to apply a magnetic field variation to the magnetic working substance, and the solid cooling portion is a magnetic refrigerator.

* * * * *